United States Patent
Myung et al.

(10) Patent No.: US 11,297,683 B2
(45) Date of Patent: *Apr. 5, 2022

(54) METHOD OF RECEIVING DATA FOR A USER EQUIPMENT IN A WIRELESS COMMUNICATION SYSTEM AND APPARATUS USING THE SAME

(71) Applicant: LG ELECTRONICS INC., Seoul (KR)

(72) Inventors: Sechang Myung, Seoul (KR); Seonwook Kim, Seoul (KR); Hanjun Park, Seoul (KR); Joonkui Ahn, Seoul (KR); Suckchel Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 34 days.

This patent is subject to a terminal disclaimer.

(21) Appl. No.: 16/065,053

(22) PCT Filed: Mar. 16, 2018

(86) PCT No.: PCT/KR2018/003105
§ 371 (c)(1),
(2) Date: Jan. 10, 2019

(87) PCT Pub. No.: WO2018/169355
PCT Pub. Date: Sep. 20, 2018

(65) Prior Publication Data
US 2020/0383090 A1 Dec. 3, 2020

Related U.S. Application Data

(60) Provisional application No. 62/505,982, filed on May 14, 2017, provisional application No. 62/501,082, (Continued)

(51) Int. Cl.
*H04W 72/04* (2009.01)
*H04W 80/08* (2009.01)
(Continued)

(52) U.S. Cl.
CPC .......... *H04W 80/08* (2013.01); *H04L 1/1819* (2013.01); *H04L 1/1896* (2013.01); *H04L 5/00* (2013.01);
(Continued)

(58) Field of Classification Search
CPC ... H04W 80/08; H04W 72/044; H04W 72/14; H04W 72/042; H04W 72/1273;
(Continued)

(56) References Cited

U.S. PATENT DOCUMENTS

2016/0226643 A1 8/2016 Mallik
2018/0092071 A1* 3/2018 Dinan ............... H04W 72/1289
(Continued)

FOREIGN PATENT DOCUMENTS

CN 101615986 12/2009
CN 102726112 10/2012
(Continued)

OTHER PUBLICATIONS

LG Electronics, "Discussion on scheduling and HARQ feedback for NR," 3GPP TSG RAN WG1 Meeting #88, R1-1702486, Nov. 13, 2017, 10 pages.

(Continued)

*Primary Examiner* — Hassan Kizou
*Assistant Examiner* — Mahbubul Bar Chowdhury
(74) *Attorney, Agent, or Firm* — Fish & Richardson P.C.

(57) ABSTRACT

A method by which a terminal receives data in a wireless communication system and a device using the method are provided. The method is characterized by receiving first data in a unit of transport block, the transport block including at least one code block, transmitting acknowledgement/negative-acknowledgement (ACK/NACK) information for each code block, of which there is at least one, and receiving, in a unit of code block, second data included in a code block, (Continued)

for which NACK has been transmitted, among code blocks, of which there is at least one.

10 Claims, 17 Drawing Sheets

Related U.S. Application Data filed on May 3, 2017, provisional application No. 62/475,863, filed on Mar. 24, 2017, provisional application No. 62/472,601, filed on Mar. 17, 2017.

(51) Int. Cl.
| | | |
|---|---|---|
| *H04W 72/14* | (2009.01) | |
| *H04L 1/18* | (2006.01) | |
| *H04W 76/27* | (2018.01) | |
| *H04L 5/00* | (2006.01) | |
| *H04W 72/12* | (2009.01) | |
| *H04L 1/16* | (2006.01) | |

(52) U.S. Cl.
CPC ....... *H04W 72/042* (2013.01); *H04W 72/044* (2013.01); *H04W 72/14* (2013.01); *H04W 76/27* (2018.02); *H04L 1/1621* (2013.01); *H04W 72/1273* (2013.01)

(58) Field of Classification Search
CPC ........ H04W 76/27; H04L 5/00; H04L 5/0055; H04L 5/0044; H04L 5/0094; H04L 1/1896; H04L 1/1819; H04L 1/1621; H04L 1/1614; H04L 1/18
See application file for complete search history.

(56) References Cited

U.S. PATENT DOCUMENTS

| | | | |
|---|---|---|---|
| 2018/0123765 A1* | 5/2018 | Cao | H04L 1/1893 |
| 2018/0145703 A1 | 5/2018 | Li et al. | |
| 2018/0145797 A1* | 5/2018 | Yeo | H04L 1/1896 |
| 2018/0167931 A1* | 6/2018 | Papasakellariou | H04L 1/1887 |
| 2018/0234881 A1 | 8/2018 | Hosseini et al. | |
| 2018/0270022 A1 | 9/2018 | Sun et al. | |
| 2019/0181986 A1* | 6/2019 | Kitamura | H04L 1/1819 |
| 2019/0253204 A1* | 8/2019 | Takeda | H04W 28/04 |
| 2019/0327751 A1* | 10/2019 | Dong | H04L 5/0037 |
| 2019/0334664 A1* | 10/2019 | Guan | H04L 1/1887 |
| 2020/0014491 A1* | 1/2020 | Takeda | H04L 5/0082 |
| 2020/0076543 A1* | 3/2020 | Yeo | H04L 1/1896 |
| 2020/0252954 A1* | 8/2020 | Kim | H04L 1/0061 |

FOREIGN PATENT DOCUMENTS

| | | |
|---|---|---|
| CN | 105530072 | 4/2016 |
| CN | 106465173 | 2/2017 |
| EP | 3550752 | 10/2019 |
| JP | 2016121998 | 7/2016 |
| RU | 2504076 | 1/2014 |
| WO | WO2011031019 | 3/2011 |
| WO | WO2017034096 | 3/2017 |
| WO | WO2017221871 | 12/2017 |

OTHER PUBLICATIONS

MediaTek Inc., "On multiple HARQ bits per TB and feedback mechanism," 3GPP TSG RAN WG1 Meeting #88, R1-1702738, Feb. 13, 2017, 6 pages.
NTT DOCOMO, Inc., "Views on HARQ enhancements for NR," 3GPP TSG RAN WG1 Meeting #88, R1-1702815, Feb. 13, 2017, 6 pages.
Samsung, "CB-group based retransmission for eMBB," 3GPP TSG RAN WG1 Meeting #88, R1-1702990, Feb. 13, 2017, 11 pages.
Japanese Office Action in Japanese Patent Appln. No. 2019-551273, dated Oct. 20, 2020, 6 pages (with English translation).
Russian Notice of Allowance in Russian Appln. No. 2019129084, dated Jun. 19, 2020, 24 pages (with English translation).
United States Notice of Allowance in U.S. Appl. No. 16/281,735, dated Aug. 29, 2019, 10 pages.
Indian Office Action in Indian Application No. 201937035647, dated Nov. 13, 2020, 9 pages (with English translation).
Extended European Search Report in European Application No. 18767430.4, dated Mar. 16, 2020, 11 pages.
Catt, "NR Scheduling and HARQ operation," R1-1700202, 3GPP TSG RAN WG1 AH_NR Meeting, Spokane, USA, dated Jan. 16-20, 2017, 3 pages.
CN Office Action in Chinese Appln. No. 201880018379.5, dated Jul. 23, 2021, 14 pages (with English translation).
Nokia & Alcatel-Lucent Shanghai Bell, "Multi-bit feedback for NR HARQ operation," R1-1703325, Presented at 3GPP TSG-RAN WG1 Meeting #88, Athens, Greece, Feb. 13-17, 2017, 5 pages.
NTT DOCOMO, "Discussion on Codeword-to-Layer Mapping," R1-1702851, Presented at 3GPP TSG RAN WG1 Meeting #88, Athens, Greece Feb. 13-17, 2017, 3 pages.
Samsung, "TB/CB Handling for eMBB," R1-1700958, Presented at 3GPP TSG RAN WG1 NR Ad-Hoc Meeting, Spokane, USA, Jan. 16-20, 2017, 5 pages.
Office Action in Brazilian Appln. No. BR1120190192190, dated Jul. 20, 2021, 11 pages (with English translation).

* cited by examiner

FIG. 15

TB-based scheduling DCI

| CBG-ReTx "0" | NDI | RV | HARQ | MCS (5bit) | RA | ⋮ |

241

CBG-based scheduling DCI

| CBG-ReTx "1" | NDI | RV | HARQ | MCS (2bit) | CBG indication (3bit) | RA | ⋮ |

242

METHOD OF RECEIVING DATA FOR A USER EQUIPMENT IN A WIRELESS COMMUNICATION SYSTEM AND APPARATUS USING THE SAME

CROSS-REFERENCE TO RELATED APPLICATIONS

This application is a National Stage application under 35 U.S.C. § 371 of International Application No. PCT/KR2018/003105, filed on Mar. 16, 2018, which claims the benefit of U.S. Provisional Application No. 62/505,982, filed on May 14, 2017, U.S. Provisional Application No. 62/501,082, filed on May 3, 2017, U.S. Provisional Application No. 62/475,863, filed on Mar. 24, 2017, and U.S. Provisional Application No. 62/472,601, filed on Mar. 17, 2017. The disclosures of the prior applications are incorporated by reference in their entirety.

BACKGROUND OF THE INVENTION

Field of the Invention

The present invention relates to wireless communication and, more particularly, to a method in which a UE receives data in a wireless communication system and a device using the same.

Related Art

As a growing number of communication devices require higher communication capacity, there is a need for advanced mobile broadband communication as compared to existing radio access technology (RAT). Massive machine-type communication (MTC), which provides a variety of services anytime and anywhere by connecting a plurality of devices and a plurality of objects, is also one major issue to be considered in next-generation communication.

Designs for communication systems considering services or user equipments (UEs) sensitive to reliability and latency are under discussion, and next-generation RAT considering advanced mobile broadband communication, massive MTC, and ultra-reliable and low-latency communication (URLLC) may be referred to as new RAT or new radio (NR).

In existing Long-Term Evolution (LTE), when a transport block has a size greater than a predetermined size, data to be transmitted is divided into a plurality of code blocks, and a channel code and a cyclic redundancy check (CRC) are added per code block to be included in the transport block, thereby transmitting the transport block through one data channel. A UE attempts decoding in the data channel. Here, when the UE fails to decode even any one of the plurality of code blocks included in the transport block, the UE transmits a NACK of the transport block. Then, a BS retransmits the entire transmission block including the corresponding code block. That is, in a hybrid automatic repeat request (HARQ) operation of existing LTE, transmission and retransmission are performed by the transport block.

On the other hand, since NR is considering employing a wider system bandwidth than that in existing LTE, one transport block is highly likely to have a relatively large size, and thus one transport block may include a greater number of code blocks.

When an HARQ operation is performed by the transport block in NR in the same manner as in existing LTE, even though only a small number of code blocks fail to be decoded, the entire transport block including the corresponding code blocks needs to be retransmitted, which is inefficient in resource utilization.

SUMMARY OF THE INVENTION

An aspect of the present invention is to provide a method in which a UE receives data in a wireless communication system and a device using the same.

In one aspect, provided is a method for receiving, by a user equipment (UE), data in a wireless communication system. The method includes receiving first data by a transport block (TB), the TB comprising at least one code block group (CBG), transmitting acknowledgement/negative acknowledgement (ACK/NACK) information relating to each of the at least one CBG and receiving second data, which is comprised in a CBG of which an NACK is transmitted among the at least one CBG, by a CBG.

The method may further include receiving a higher-layer signal. The higher-layer signal may set whether CBG-based data retransmission is performed.

The second data may be part of the first data.

The method may further include receiving first downlink control information (DCI) for scheduling the first data.

The method may further include receiving second DCI for scheduling the second data.

Each of the first DCI and the second DCI may comprise one bit to indicate which of TB-based scheduling and CBG-based scheduling is used for scheduling.

When a first hybrid automatic repeat request (HARQ) process identifier (ID) field comprised in the first DCI has the same value as a second HARQ process ID field comprised in the second DCI and a second new data indicator (NDI) field comprised in the second DCI has the same value as a first NDI field comprised in the first DCI, remaining fields comprised in the second DCI may be interpreted as information for CBG-based scheduling.

When a first HARQ process ID field comprised in the first DCI has the same value as a second HARQ process ID field comprised in the second DCI and a second NDI field comprised in the second DCI has a different value from that of a first NDI field comprised in the first DCI, remaining fields comprised in the second DCI may be interpreted as information for TB-based scheduling.

When a higher-layer signal sets CBG-based data retransmission, each of the first DCI and the second DCI may comprise a CBG indication field indicating a CBG.

When a first HARQ process ID field comprised in the first DCI has the same value as a second HARQ process ID field comprised in the second DCI, a second NDI field comprised in the second DCI has a different value from that of a first NDI field comprised in the first DCI, and the CBG indication field comprised in the second DCI indicates only some of CBGs comprised in the TB, an NACK for all the CBGs comprised in the TB may be transmitted.

In another aspect, provided is a user equipment (UE). The UE includes a transceiver to transmit and receive a radio signal and a processor connected to the transceiver. The processor receives first data by a transport block (TB), the TB comprising at least one code block group (CBG), transmits acknowledgement/negative acknowledgement (ACK/NACK) information relating to each of the at least one CBG and receives second data, which is comprised in a CBG of which an NACK is transmitted among the at least one CBG, by a CBG.

According to the present invention, an HARQ operation between a BS and a UE includes code block or code block group-based retransmission. Therefore, it is possible to reduce inefficiency in resource utilization which occurs in the conventional art. Further, according to the present invention, when the UE receives downlink control information, the UE can easily and clearly distinguish whether the information is for transport block-based scheduling or code block group-based scheduling. The present invention also provides a specific method for configuring downlink control information related to code block group-based scheduling.

BRIEF DESCRIPTION OF THE DRAWINGS

FIG. 15 illustrates CBG-based scheduling DCI in a combination of proposed methods A-1 and B-1.

DESCRIPTION OF EXEMPLARY EMBODIMENTS

Figure 1:
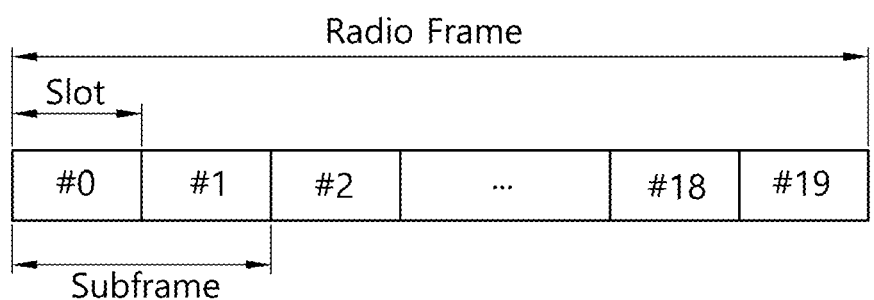
FIG. 1 shows the structure of a radio frame.

FIG. 1 shows the structure of a radio frame.
Referring to FIG. 1, the radio frame includes 10 subframes, and each of the subframes includes 2 slots. The slots within the radio frame are given slot numbers from #0 to #19. The time that is taken for one subframe to be transmitted is called a Transmission Time Interval (TTI). The TTI can be called a scheduling unit for data transmission. For example, the length of one radio frame can be 10 ms, the length of one subframe can be 1 ms, and the length of one slot can be 0.5 ms.

The structure of the radio frame is only an example. Accordingly, the number of subframes included in the radio frame or the number of slots included in the subframe can be changed in various ways.

Figure 2:
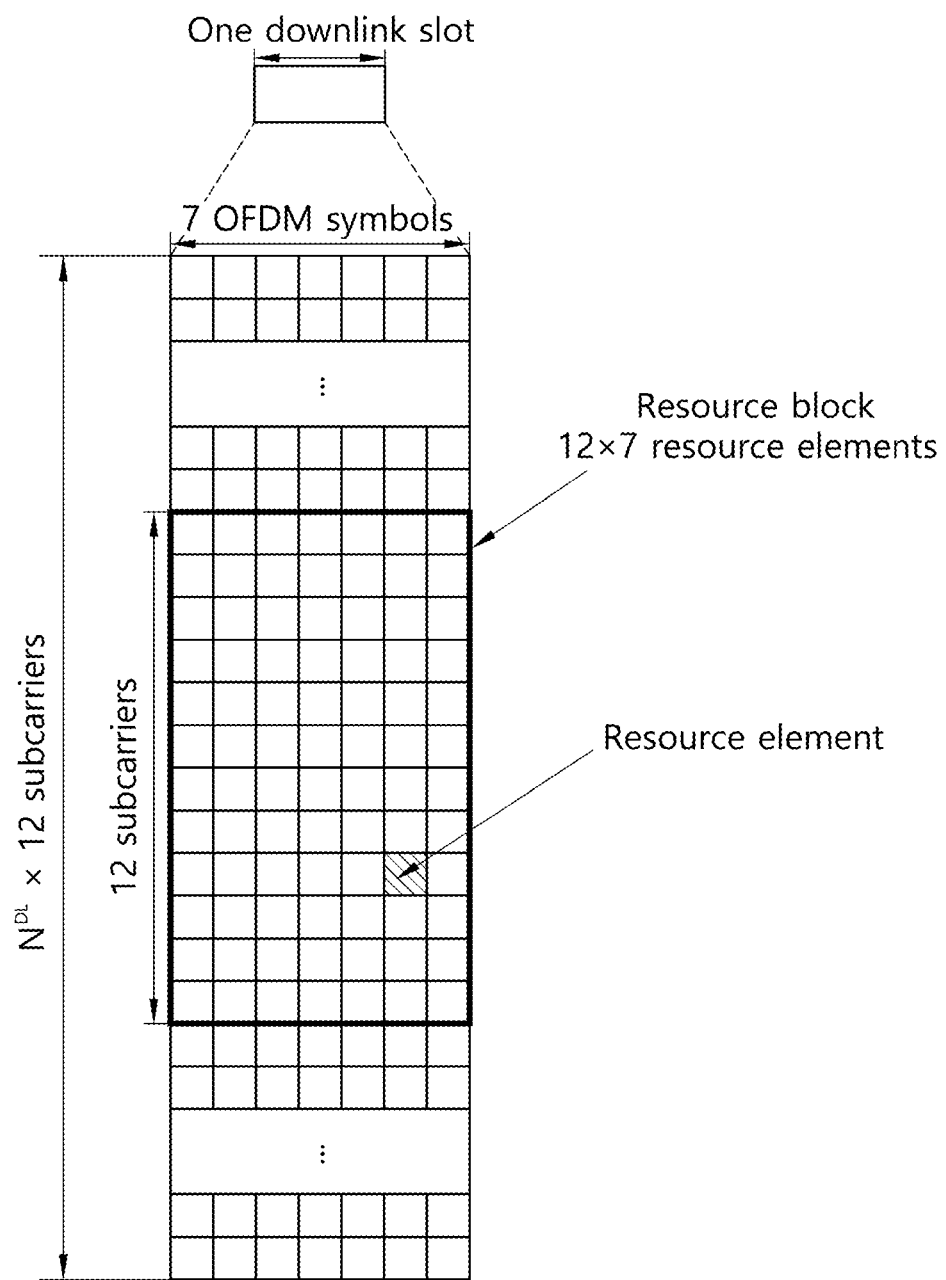
FIG. 2 shows an example of a resource grid for one slot.

FIG. 2 shows an example of a resource grid for one slot.
The slot includes a downlink slot and an uplink slot. The downlink slot includes a plurality of Orthogonal Frequency Division Multiplexing (OFDM) symbols in a time domain. The OFDM symbol indicates a specific time interval, and the OFDM symbol may also be called an SC-FDMA symbol depending on a transmission method. The downlink slot includes an $N_{RB}$ number of Resource Blocks (RBs) in a frequency domain. The RB is a resource allocation unit, and the RB includes one slot in the time domain and a plurality of contiguous subcarriers in the frequency domain.

The number of RBs $N_{RB}$ included in the downlink slot depends on a downlink transmission bandwidth configured in a cell. For example, in an LTE system, the number $N_{RB}$ can be any one of 6 to 110. An uplink slot can have the same structure as the downlink slot.

Each element on the resource grid is called a Resource Element (RE). An RE on the resource grid can be identified by an index pair (k,l) within a slot. Here, $k(k=0, \ldots, N_{RB} \times 12-1)$ is a subcarrier index within the frequency domain, and $l(l=0, \ldots, 6)$ is an OFDM symbol index within the time domain.

One RB is illustrated as including 7×12 REs, including 7 OFDM symbols in the time domain and 12 subcarriers in the frequency domain, but the number of OFDM symbols and the number of subcarriers within one RB are not limited thereto. The number of OFDM symbols and the number of subcarriers can be changed in various ways depending on the length of a CP, frequency spacing, etc. For example, in the case of a normal Cyclic Prefix (CP), the number of OFDM symbols is 7 and in the case of an extended CP, the number of OFDM symbols is 6. In one OFDM symbol, one of 128, 256, 512, 1024, 1536, and 2048 can be selected and used as the number of sub carriers.

Figure 3:
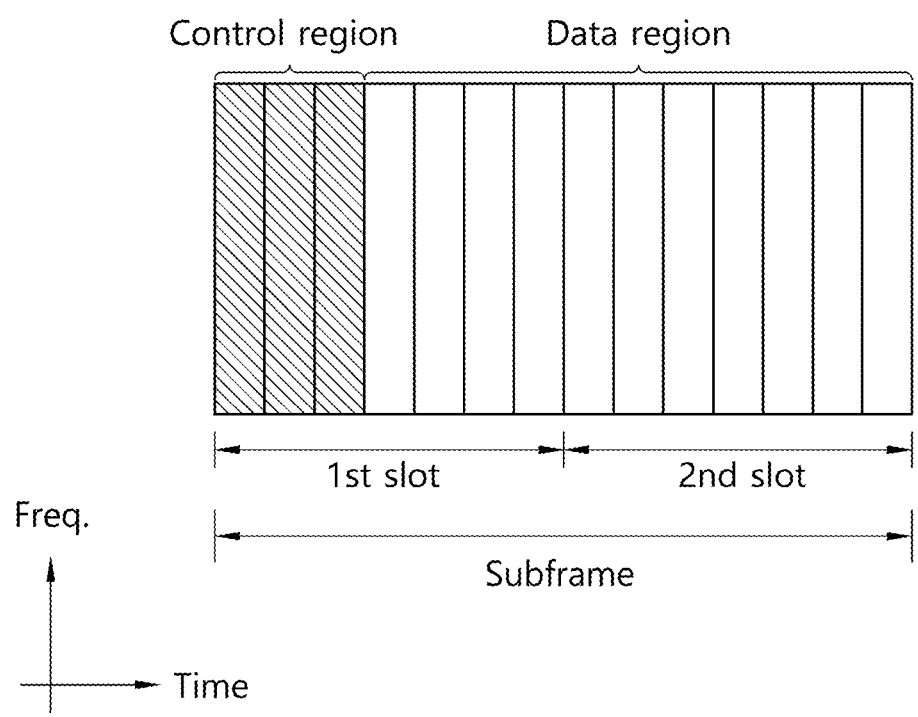
FIG. 3 shows the structure of an uplink subframe.

FIG. 3 shows the structure of an uplink subframe.
The uplink subframe can be divided into a control region and a data region in a frequency domain. Physical uplink control channels (PUCCHs) on which uplink control information is transmitted are allocated to the control region. Physical uplink shared channels (PUSCHs) through which data is transmitted are allocated to the data region. A terminal (user equipment: UE) may send or may not send a PUCCH and a PUSCH at the same time depending on a configuration.

A PUCCH for one terminal is allocated as an RB pair in a subframe. RBs belonging to the RB pair occupy different subcarriers in a first slot and a second slot. A frequency occupied by RBs that belong to an RB pair allocated to a PUCCH is changed on the basis of a slot boundary. This is called that the RB pair allocated to the PUCCH has been frequency-hopped in the slot boundary. A terminal can obtain a frequency diversity gain by sending uplink control information through different subcarriers over time.

Uplink control information transmitted on a PUCCH includes ACK/NACK, Channel State Information (CSI) indicative of a downlink channel state, a Scheduling Request (SR), that is, an uplink radio resource allocation request, etc. The CSI includes a Precoding Matrix Index (PMI) indicative of a precoding matrix, a Rank Indicator (RI) indicative of a rank value that is preferred by UE, a Channel Quality Indicator (CQI) indicative of a channel state, etc.

A PUSCH is mapped to an uplink shared channel (UL-SCH), that is, a transport channel. Uplink data transmitted on the PUSCH can be a transmission block, that is, a data block for an UL-SCH that is transmitted during a TTI. The transmission block can be user information. Alternatively, the uplink data can be multiplexed data. The multiplexed data can be obtained by multiplexing the transmission block for the UL-SCH and control information. For example, control information multiplexed with data can include a CQI, a PMI, ACK/NACK, an RI, etc. Alternatively, the uplink data may include only control information.

Figure 4:
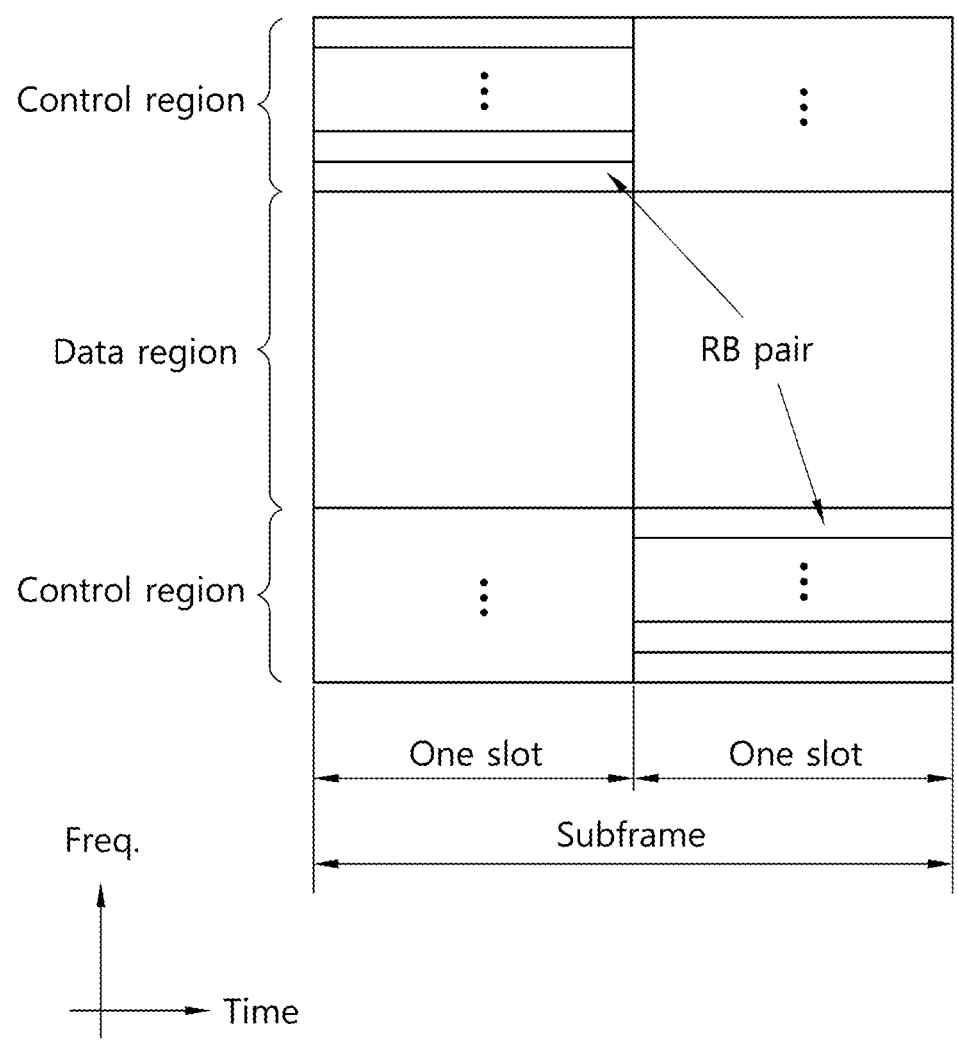
FIG. 4 shows the structure of a downlink subframe.

FIG. 4 shows the structure of a downlink subframe.

The downlink subframe includes two slots in a time domain, and each of the slots includes 7 OFDM symbols in a normal CP. A maximum of former 3 OFDM symbols (i.e., a maximum of 4 OFDM symbols for a 1.4 MHz bandwidth) in the first slot within the downlink subframe corresponds to a control region to which control channels are allocated, and the remaining OFDM symbols correspond to a data region to which Physical Downlink Shared Channels (PDSCHs) are allocated. The PDSCH means a channel on which data is transmitted from a BS or a node to UE.

Control channels transmitted in the control region include a physical control format indicator channel (PCFICH), a physical hybrid-ARQ indicator channel (PHICH), and a physical downlink control channel (PDCCH).

A PCFICH transmitted in the first OFDM symbol of the subframe carries a Control Format Indicator (CFI), that is, information about the number of OFDM symbols (i.e., the size of the control region) that is used to send control channels within the subframe. A terminal first receives a CFI on a PCFICH and then decodes a PDCCH. Unlike a PDCCH, a PCFICH does not use blind decoding, and the PCFICH is transmitted through the fixed PCFICH resource of a subframe.

A PHICH carries an acknowledgement (ACK)/not-acknowledgement (NACK) signal for an uplink Hybrid Automatic Repeat request (HARQ). An ACK/NACK signal for uplink data transmitted by UE is transmitted through a PHICH. The PHICH is described in detail later.

A PDCCH is a control channel on which Downlink Control Information (DCI) is transmitted. The DCI can include the allocation of PDSCH resources (also called downlink grant (DL grant)), the allocation of physical uplink shared channel (PUSCH) resources (also called an uplink grant (UL grant)), a set of transmit power control commands for individual UEs within a specific terminal group and/or the activation of a Voice over Internet Protocol (VoIP).

In next-generation communication, a growing number of communication devices require higher communication capacity. Accordingly, there is a need for advanced mobile broadband communication as compared to existing radio access technology. Massive machine-type communication (MTC), which provides a variety of services anytime and anywhere by connecting a plurality of devices and a plurality of objects, is also one major issue to be considered in next-generation communication. Further, designs for communication systems considering services or UEs sensitive to reliability and latency are under discussion. The introduction of next-generation radio access technology considering advanced mobile broadband communication, massive MTC, and ultra-reliable and low-latency communication (URLLC) is under discussion. In the present invention, for convenience, the next-generation radio access technology is referred to as new RAT or new radio (NR).

Figure 5:
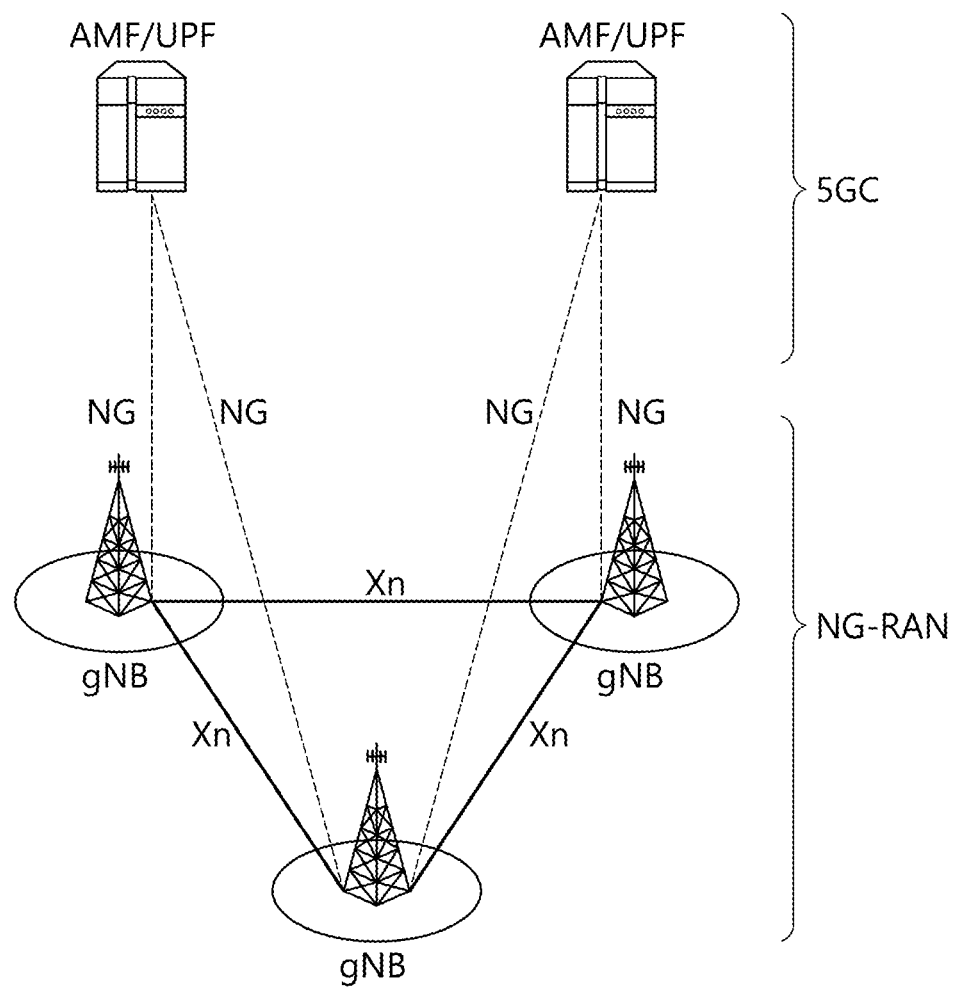
FIG. 5 illustrates the system architecture of a next-generation radio access network (NG-RAN) according to NR.

FIG. 5 illustrates the system architecture of a next-generation radio access network (NG-RAN) according to NR.

Referring to FIG. 5, the NG-RAN may include a gNB and/or an eNB that provides a termination of user plane and control plane protocols to a UE. FIG. 5 illustrates a case where only a gNB is included. The gNB and the eNB are connected to each other via an Xn interface. The gNB and the eNB are connected to a 5G core network (5GC) via an NG interface. Specifically, the gNB and the eNB are connected to an access and mobility management function (AMF) through an NG-C interface, and are connected to a user plane function (UPF) through an NG-U interface.

Figure 6:
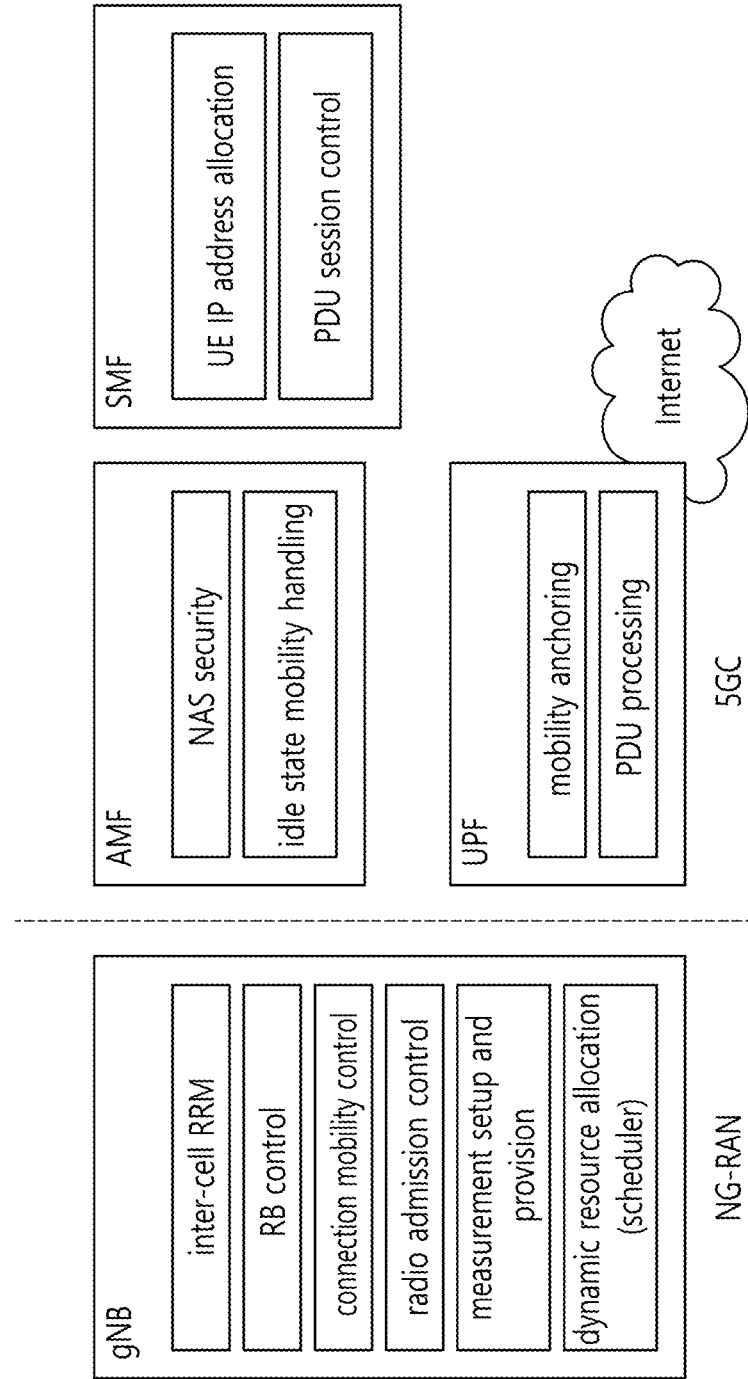
FIG. 6 illustrates a functional division between an NG-RAN and a 5GC.

FIG. 6 illustrates a functional division between an NG-RAN and a 5GC.

Referring to FIG. 6, a gNB may provide functions of inter-cell radio resource management (RRM), radio bearer (RB) control, connection mobility control, radio admission control, measurement setup and provision, and dynamic resource allocation. An AMF may provide functions of NAS security and idle state mobility handling. A UPF may provide functions of mobility anchoring and PDU processing. A session management function (SMF) may provide functions of UE IP address allocation and PDU session control.

[Subframe Structure in NR]

In NR, a self-contained subframe structure is considered in order to minimize a data transmission delay.

Figure 7:
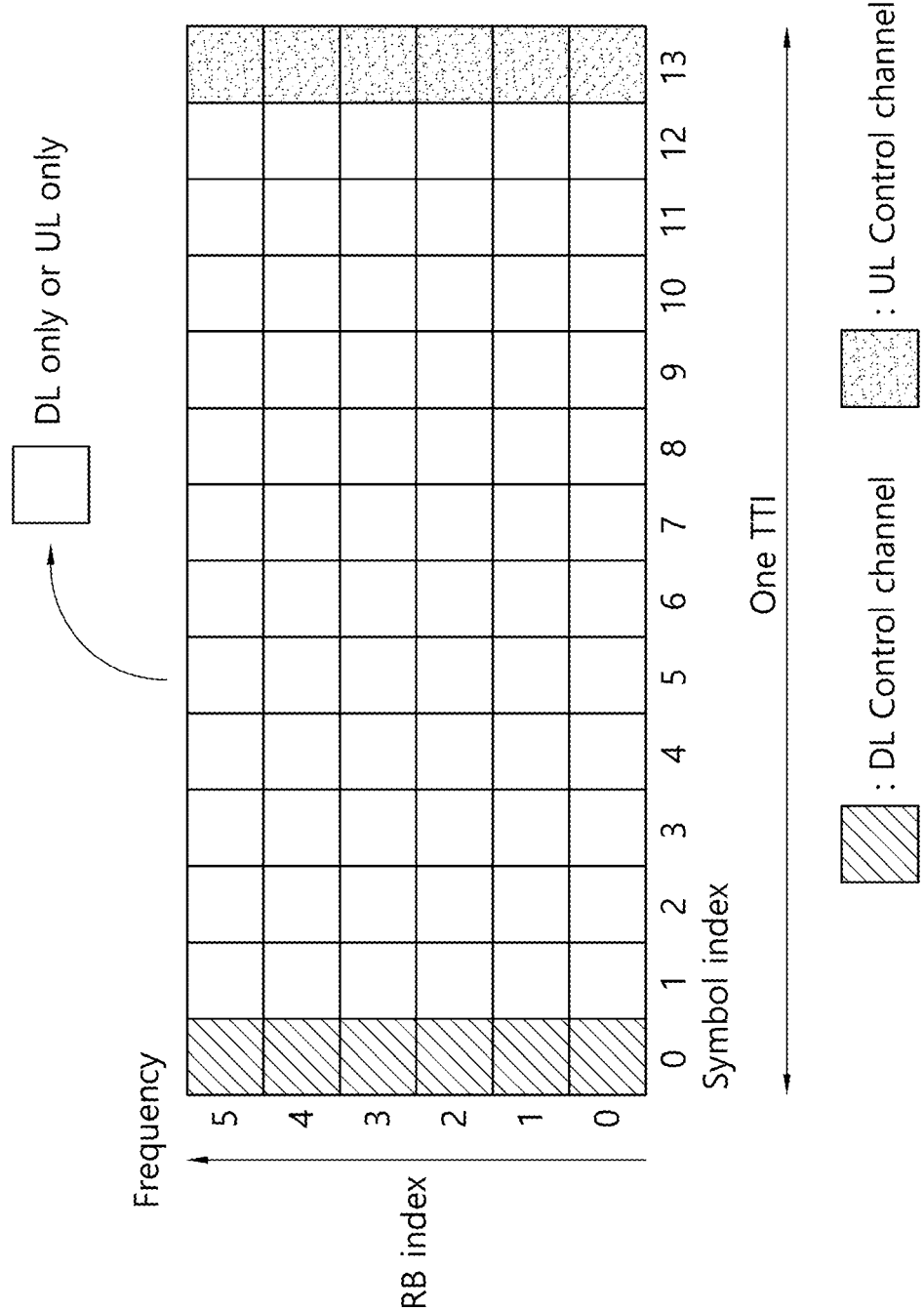
FIG. 7 illustrates a self-contained subframe structure.

FIG. 7 illustrates a self-contained subframe structure.

Referring to FIG. 7, the first symbol of a subframe may be a downlink (DL) control region, and the last symbol of the subframe may be an uplink (UL) control region. A region between the first symbol and the last symbol may be used for DL data transmission or for UL data transmission.

The self-contained subframe structure is characterized in that both DL transmission and UL transmission can be performed within one subframe, thus enabling DL data transmission and UL ACK/NACK reception within the subframe. Accordingly, when an error occurs in transmitting data, it is possible to reduce the time taken to retransmit the data, thereby minimizing a delay in ultimate data transmission.

Examples of the self-contained subframe may include the following four types of subframes. That is, the self-contained subframe may be configured as follow in the time domain.

1) DL control period+DL data period+guard period (GP)+UL control period

2) DL control period+DL data period

3) DL control period+GP+UL data period+UL control period

4) DL control period+GP+UL data period

In these self-contained subframe structures, a time gap is required for a process in which a BS and a UE switch from a transmission mode to a reception mode or a process in which a BS and a UE switch from the reception mode to the transmission mode. To this end, some OFDM symbols at the time of switching from a DL to a UL in a subframe structure may be set as a GP.

[Analog Beamforming]

Millimeter waves (mmW) have a short wavelength, in which a plurality of antennas can be installed in the same area. That is, a 30-GHz band has a wavelength of 1 cm, in which a total of 100 antenna elements can be installed in a two-dimensional array at an interval of 0.5λ (wavelength) intervals on a panel of 5 by 5 cm. Therefore, in mmW, a plurality of antenna elements is used to increase a beamforming gain, thereby increasing coverage or increasing throughput.

In this case, when each antenna element has a transceiver unit (TXRU) in order to adjust transmission power and a phase, independent beamforming can be performed for each frequency resource. However, it is cost-ineffective to install a TXRU in each of the 100 antenna elements. Therefore, it is considered to map a plurality of antenna elements to one TXRU and to adjust the direction of a beam using an analog phase shifter. This analog beamforming method can create a beam in only one direction in the entire band and thus cannot achieve frequency-selective beamforming.

A hybrid band-pass filter having B TXRUs, where B is smaller than Q as the number of antenna elements, is considered as an intermediate form of a digital band-pass filter and an analog band-pass filter. In this case, although changing depending on the method for mapping the B TXRUs and the Q antenna elements, the number of directions of beams that can be simultaneously transmitted is limited to B or less.

Hereinafter, the present invention will be described.

In existing LTE, when a DL transport block (TB) has a size greater than a predetermined size, data (or bit stream) to be transmitted is divided into a plurality of code blocks (CBs), and a channel coding is performed per CB and a cyclic redundancy check (CRC) is added per CB, thereby transmitting the data through one PDSCH/TB. That is, one TB may include a plurality of CBs and is transmitted through a PDSCH.

A UE attempts decoding the transmitted PDSCH. Here, the UE fails to decode even any one of the plurality of CBs included in one TB, the UE transmits a NACK for the PDSCH/TB to a BS. Then, the BS retransmits the entire TB including the corresponding CB. That is, in an HARQ operation of existing LTE, transmission and retransmission are performed by the TB.

Meanwhile, in NR, a wider system bandwidth (BW) than that in LTE/LTE-A (hereinafter, referred to as "LTE") is considered, and accordingly one TB is highly likely to have a relatively large size. Thus, the number of CBs forming one TB (that is, the number of CBs included in one TB) may be greater than that in existing LTE.

Therefore, when an HARQ operation is performed by the TB in the same manner as in the existing LTE system, even though a NACK is reported due to the failure of decoding only a small number of CBs, it is required to retransmit the entire TB including the corresponding CBs, which is inefficient in resource utilization.

Further, in NR, some symbols included in a resource allocated for transmitting data type 1 (e.g., for enhanced mobile broadband (eMBB)), which has a relatively long TTI and is delay-insensitive, are punctured, after which data type 2 (e.g., for ultra-reliable and low-latency communication (URLLC)), which has a relatively short TTI and is delay-sensitive, can be transmitted therethrough. In this case, a decoding failure (i.e., NACK transmission) may be concentrated on some particular CBs among a plurality of CBs included in one TB transmitted for data type 1.

The present invention proposes a method for configuring a DCI format with a single payload size applied to CB or code block group (CBG)-based (retransmission) scheduling considering the operational characteristics of NR.

The proposed method includes a DCI configuration method for notifying a UE whether DL data transmission performed by a BS is initial TB transmission or a CBG-based retransmission and, if the DL data transmission is retransmission, which CB/CBG in a TB is retransmitted.

Hereinafter, one CBG may be configured with all CBs forming a single TB or may be configured with one or least two CBs of CBs forming a single TB.

Hereinafter, TB-based transmission or TB-based retransmission (scheduling) may refer to transmission or retransmission (scheduling) for all the CBs/CBGs forming a corresponding TB. CBG-based retransmission (scheduling) may refer to retransmission (scheduling) for some CBs among CBs included in a TB.

Although the following proposed methods mostly describe a DL data scheduling operation, the proposed methods of the present invention can be applied to both DL and UL data scheduling operations.

Figure 8:
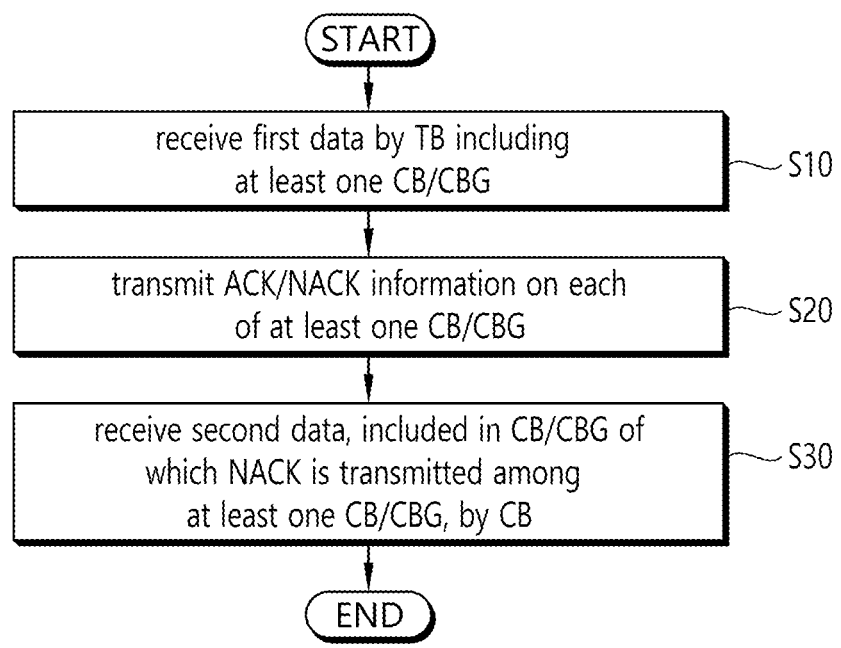
FIG. 8 illustrates a data reception method of a UE according to an embodiment of the present invention.

FIG. 8 illustrates a data reception method of a UE according to an embodiment of the present invention.

Referring to FIG. 8, the UE receives first data by the TB including at least one CB or CBG (S10). Here, one CBG may include, for example, one, two, four, six or eight CBs.

The UE transmits ACK/NACK information on each of the at least one CBG (S20) and receives second data, included in a CBG of which a NACK is transmitted among the at least one CBG, by the CBG (S30).

Figure 9:
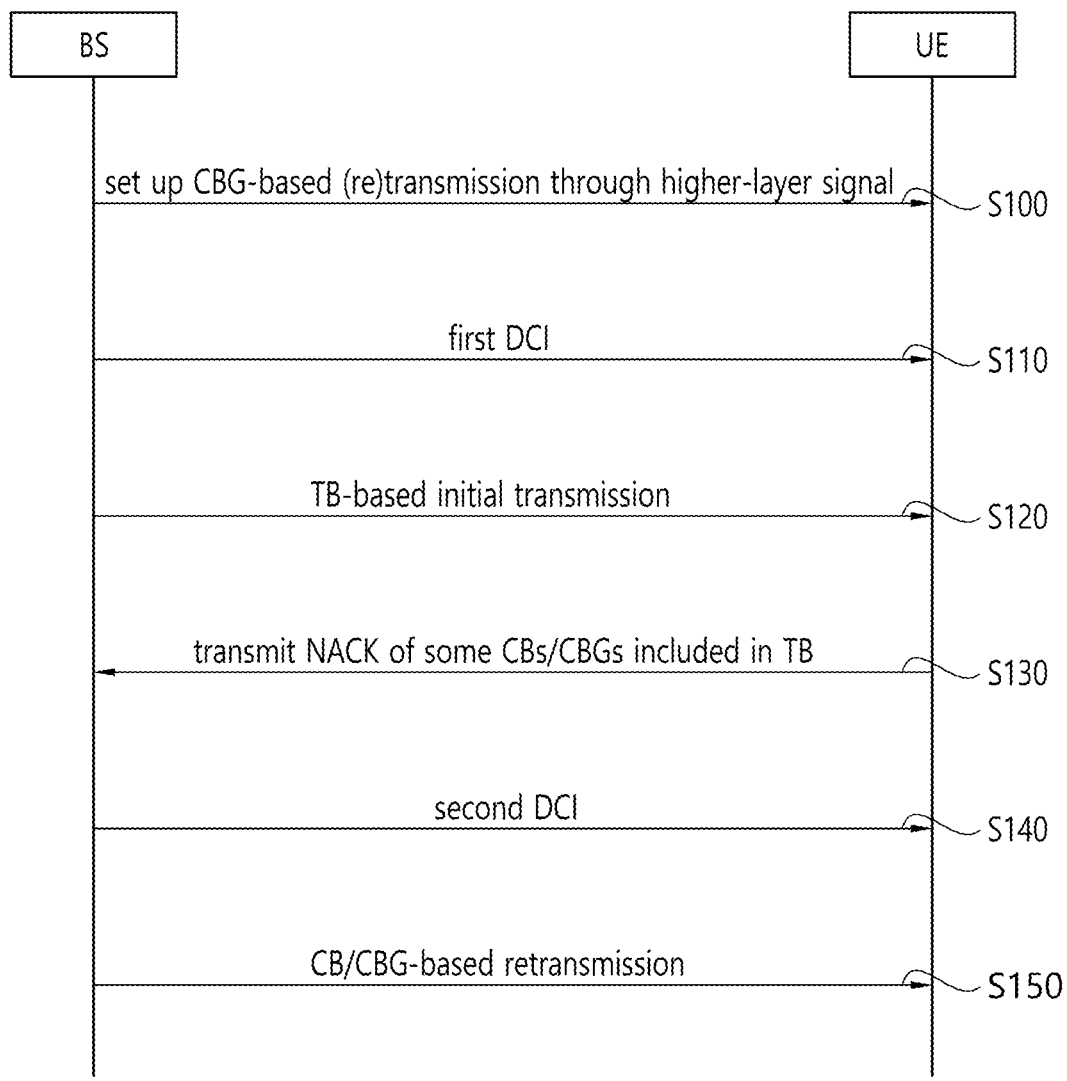
FIG. 9 illustrates a specific example of applying the method of FIG. 8.

FIG. 9 illustrates a specific example of applying the method of FIG. 8.

Referring to FIG. 9, a BS may set up CBG-based transmission (or retransmission) to a UE through a higher-layer signal, such as a radio resource control (RRC) signal (S100). The RRC signal may semi-statically set CBG-based transmission/retransmission.

The BS transmits first downlink control information (DCI) to the UE (S110). The first DCI may include at least one of information for scheduling first data, that is, information indicating a resource for receiving the first data, a corresponding HARQ process ID, a new data indicator (NDI) for distinguishing initial transmission from retransmission, a CBG indication field, and one bit indicating which of TB-based scheduling and CB-based scheduling is used. The first DCI may be DCI associated with TB-based scheduling.

The BS performs TB-based initial transmission to the UE (S120).

The UE may transmit a NACK of some CBs/CBGs included in the TB (S130).

The BS transmits second DCI to the UE (S140). Here, the second DCI may include at least one of information for scheduling first data, that is, information indicating a resource for receiving the first data, a corresponding HARQ process ID, an NDI for distinguishing initial transmission from retransmission, a CBG indication field, and one bit indicating which of TB-based scheduling and CB-based scheduling is used. For example, the BS may report a CBG that is retransmitted via the second DCI. The second DCI may be DCI associated with CBG-based scheduling.

Thereafter, the BS performs CB/CBG-based retransmission to the UE (S150). For example, the BS may retransmit the CBG indicated through the second DCI by the CBG.

Hereinafter, the present invention will be described in detail.

(A) Method for Distinguishing TB-Based Scheduling from CBG-Based Retransmission Scheduling 1) Method A-1: TB-based scheduling and CBG-based retransmission scheduling can be distinguished through a one-bit flag in DCI.

In order to decode DL data (i.e., PDSCH) transmitted from a BS, a UE first needs to decode a corresponding (downlink grant) PDCCH and to interpret DCI.

DCI used for existing TB-based scheduling may include resource allocation (RA) information used for DL data transmission, modulation and coding scheme (MCS) information, a new data indicator (NDI), a redundancy version (RV), and HARQ process ID information.

For example, DCI format 1 is used for one PDSCH codeword scheduling and may include the following information: 1) a resource allocation header (indicating resource allocation type 0/type 1)—if a DL bandwidth is less than 10 physical resource blocks (PRBs), no resource allocation header s included and resource allocation type 0 may be assumed; 2) a resource block assignment; 3) a modulation and coding scheme (MCS); 4) an HARQ process number (also referred to as an HARQ process ID); 5) a new data indicator (NDI); 6) a redundancy version (RV); 7) a transmission power command (TPC) for a PUCCH; and 8) a DL assignment index (only in TDD).

When a one-bit flag is added to a corresponding DCI with the payload size of DCI (format) used for TB-based (re)transmission scheduling matching that of DCI (format) used for CBG-based retransmission scheduling, it is possible to distinguish whether the DCI received by the UE is for TB-based scheduling or CBG retransmission scheduling.

For example, for convenience, a one-bit field indicating whether CBG-based retransmission is performed in DCI is defined as a "CBG-ReTx field". When the CBG-ReTx field is OFF, the UE may interpret the remaining fields in the DCI as TB-based scheduling information and may receive DL data, as in the conventional LTE operation. However, when the CBG-ReTx field is ON, the UE may interpret the remaining fields in the DCI as CBG-based retransmission scheduling information and may receive DL data accordingly.

This method can dynamically and adaptively apply TB-based scheduling and CBG-based retransmission scheduling to the UE through a CBG-ReTx field in DCI at the time of receiving the DCI.

2) Method A-2: TB-based transmission and CBG-based retransmission scheduling can be distinguished depending on the value of an NDI field in DCI.

This method is a semi-static method in which a UE receives a field for setting a CBG-based retransmission operation from an RRC connection setup message or an RRC reconfiguration message and differently interprets scheduling depending on whether the field indicates that a CBG-based retransmission operation is Enable or Disable.

Specifically, a BS may semi-statically configure for the UE whether data retransmission is performed only by the TB unit or by the CBG unit through a higher-layer layer signal (e.g., RRC signal). When CBG-based retransmission(=retransmission by the CBG unit) is configured, it is possible to distinguish whether the data scheduled through data scheduling DCI is for TB-based transmission or for CBG-based retransmission according to the value of an NDI field in the data scheduling DCI.

Specifically, with the CBG-based retransmission operation set to be enabled for the UE through the higher-layer signal, when an NDI value in the DCI for scheduling a particular HARQ process ID is not toggled compared to an NDI value in previously received DCI, which corresponds to the same HARQ process ID, the UE may consider that some CBGs of a TB transmitted from the BS fail to be decoded and NACK is reported and may interpret the remaining fields in the DCI as CBG-based retransmission scheduling information.

For example, it is assumed that the UE receives first DCI for scheduling first data and then receives second DCI for scheduling second data. In this case, when a first HARQ process ID field included in the first DCI has the same value as that of a second HARQ process ID field included in the second DCI, and a second NDI field included in the second DCI has the same value as that of a first NDI field included in the first DCI (i.e., the value of the second NDI field is not toggled), the UE may interpret the remaining fields included in the second DCI as information for CB-based scheduling.

In the same situation as above, when the NDI value is toggled, the UE may interpret that a new TB is scheduled and may interpret the remaining fields in the DCI as TB-based scheduling information. That is, in the above example, when the first HARQ process ID field included in the first DCI has the same value as that of the second HARQ process ID field included in the second DCI, and the second NDI field included in the second DCI has a different value from that of the first NDI field included in the first DCI (i.e., the value of the second NDI field is toggled), the UE may interpret the remaining fields included in the second DCI as information for TB-based scheduling.

On the other hand, when the CBG-based retransmission operation is set to be disabled for the UE through the higher-layer signal, the UE may interpret the received DCI as scheduling information for TB-based (re)transmission. This method can dynamically and adaptively apply TB-based scheduling and CBG-based retransmission scheduling to the UE according to the value of an NDI field in DCI at the time of receiving the DCI.

3) Method A-3: TB-based scheduling and CBG-based retransmission scheduling can be distinguished through CRC masking of a PDCCH. That is, depending on whether data scheduling DCI is TB-based scheduling information or CBG-based retransmission scheduling information, a different CRC masking pattern may be applied to a CRC added to a PDCCH carrying the DCI.

For example, when the CRC of a received PDCCH is checked and passes a CRC test on masking pattern #1, a UE may interpret DCI in the PDCCH as TB-based scheduling information. When the CRC passes a CRC test on masking pattern #2, the UE may interpret the DCI in the PDCCH can as CBG-based retransmission scheduling information.

4) Method A-4: TB-based scheduling and CBG-based retransmission scheduling can be distinguished depending on PDCCH transmission resources. That is, in this method, it is distinguished whether data scheduling DCI is TB-based scheduling information or CBG-based retransmission scheduling information depending on resources used for transmitting a PDCCH carrying the DCI.

A resource used for transmitting a PDCCH may be set by the (lowest) index of a control channel element (CCE) included in the PDCCH or the index of a PDCCH candidate. For example, when the index of a first CCE used for the received PDCCH or the index of a PDCCH candidate is an odd number, the UE may interpret DCI in the PDCCH as TB-based scheduling information. When the index of the first CCE used for the received PDCCH or the index of the PDCCH candidate is an even number, the UE may interpret the DCI in the PDCCH as CBG-based retransmission scheduling information.

5) Method A-5: TB-based scheduling and CBG-based retransmission scheduling can be distinguished through a CBG indication field in DCI. For example, after CBG transmission/retransmission is set via a higher-layer signal, a CBG indication field may be added to DCI. That is, the CBG indication field is added to the DCI, thereby distinguishing whether the DCI received by a UE is for TB-based scheduling or CBG retransmission scheduling.

For example, when a CBG indication field in a received DCI indicates scheduling for all CBGs included in a TB, the UE may interpret the remaining fields of the DCI as information for TB-based scheduling and may receive DL data. On the other hand, when the CBG indication field in the received DCI indicates scheduling for some of the CBGs included in the TB, the UE may interpret the remaining fields of the DCI as information for CBG-based retransmission scheduling and may receive DL data accordingly.

It is assumed that first DCI for TB scheduling is received and then second DCI for CBG-based scheduling is received. In this case, the UE 1) may already know a transport block size (TBS) through the first DCI for TB scheduling. On the assumption of the TBS determined by the first DCI, the UE may receive/transmit a scheduled CBG on the basis of a modulation order obtained from an MCS field in the second DCI and resource allocation (RA) information in the second DCI. Alternatively, the UE 2) may determine a TBS on the basis of MCS and RA information in the second DCI for CBG scheduling, may scale the number of resource blocks indicated through the second DCI on the basis of the ratio of CBGs needing to be retransmitted, and may determine a resource actually used for CBG retransmission.

Figure 10:
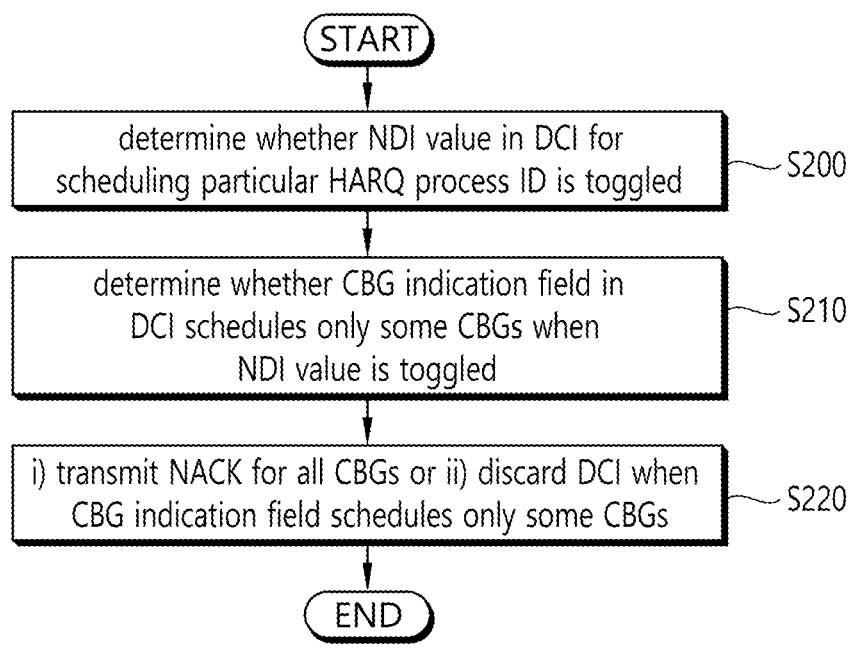
FIG. 10 illustrates an operation method of a UE receiving DCI on CBG-based retransmission.

FIG. 10 illustrates an operation method of a UE receiving DCI on CBG-based retransmission.

Referring to FIG. 10, the UE may receive DCI for scheduling a particular HARQ process ID. Here, it is determined whether an NDI value in the DCI is toggled (S200).

When the NDI value in the DCI is toggled, the UE determines whether a CBG indication field in the DCI indicates scheduling for some CBGs (i.e., CBG-based retransmission scheduling) (S210). For example, when only some CBGs among the CBGs included in a TB are scheduled to be retransmitted, it may be determined as scheduling for some CBGs.

When the CBG indication field schedules only some CBGs, the UE may i) transmit a NACK for all CBGs or ii) discard the DCI (S220).

That is, when the NDI value in the DCI for scheduling the particular HARQ process ID is toggled and the CBG indication field in the DCI indicates scheduling for some CBGs, the UE may consider that TB-based scheduling DCI is not received and 1) may transmit a NACK for the entire TB or all CBGs or 2) may discard the DCI, thereby inducing the BS to perform TB-based scheduling (DCI transmission).

This method can dynamically and adaptively apply TB-based scheduling and CBG-based retransmission scheduling to the UE according to a CBG indication field in DCI at the time of receiving the DCI.

(b) Method for Configuring Fields in DCI Used for CBG-Based Retransmission Scheduling In the following proposed methods, it is assumed that a UE already knows a TB size, N, through first TB-based scheduling DCI (first DCI). Scheduling-related parameters may be defined as follows for convenience.

1) Total TB size (number of bits or CBs): N, 2) Size of CBG scheduled to be retransmitted (number of bits or CBs): K, 3) Total number of resource blocks that can be scheduled: $R_{max}$, 4) Number of resource blocks allocated through retransmission scheduling DCI: $R_{sch}$ <Method B-1: Method for Configuring CBG-Based Scheduling DCI by Combining Modulation Order and Resource Allocation Field>

In this method, second DCI for CBG-based retransmission scheduling may indicate a modulation order (e.g., one of QPSK, 16 QAM, 64 QAM, and 256 QAM) and information on a resource block allocated for data transmission. A UE may receive/transmit a scheduled CBG on the basis of the indicated modulation order and information on the resource block.

In this case, the size of a second MCS field (modulation order field) included in the second DCI for CBG-based retransmission scheduling may be set to a smaller number of bits (e.g., 2 bits) than the size (e.g., 5 bits) of a first MCS field included in first DCI for TB-based scheduling. On the other hand, for the size of a resource allocation (RA) field, the same number of bits may be set in the first DCI for TB-based scheduling and in the second DCI for CBG-based retransmission scheduling.

Therefore, in this method, bits of the size (number of bits) of the MCS field in the first DCI for TB-based scheduling minus the size (number of bits) of the modulation order field in the second DCI for CBG-based retransmission scheduling may be used for indicating a CBG to be retransmitted within the second DCI for CBG-based scheduling.

When a data coding rate according to the combination of a CBG size, the modulation order, and the resource allocation field indicated through the retransmission scheduling DCI exceeds a specified level, the UE may omit receiving and/or decoding a CBG scheduled for retransmission or may discard the DCI.

<Method B-2: Method for Configuring CBG-Based Scheduling DCI by Combining MCS and RA Corresponding to TB Size>

CBG-based retransmission scheduling DCI (hereinafter, "second DCI") may indicate a combination of an MCS index (M) and the number of RBs (R) (hereinafter, represented by (M, R)) corresponding to a TB size of N and allocation information on R RBs. The combination of the MCS index (M) and the number of RBs (R) and the allocation information on the R RBs may relate to a table for determining a TB size according to a combination of an MCS index and the number of RBs defined for TB-based scheduling.

In this case, a plurality of (M, R) combinations having different values may correspond to one N value (TB size). Specifically, a field indicating an (M, R) combination and RA information (a field indicating a combination of R RBs selected/allocated among a total of $R_{max}$ RBs) may be configured in the DCI. In this method, bits of the sum of the sizes (number of bits) of an MCS field and an RA field in first DCI for TB-based scheduling minus the sum of the sizes (number of bits) of the (M, R) field and an RA field for the R RBs in the second DCI for the CBG-based retransmission scheduling may be used for indicating a CBG to be retransmitted within the DCI for CBG-based scheduling.

In this method, since not the entire TB is actually retransmitted, the number of RBs corresponding to the total TB size of N indicated by the DCI may be scaled according to the ratio of CBGs required to be retransmitted (e.g., the size of CBGs scheduled for retransmission/total TB size), thereby determining resources used for actual CBG retransmission.

That is, a UE may receive/transmit a CBG actually scheduled using only $R_{sca}$ RBs, $R_{sca}$ corresponding to an integer value (e.g., R×(K/N)) obtained by rounding down or up R, which is the total number of RBs indicated by the DCI, scaled by (K/N). In this case, $R_{sca}$ RBs may be first or last $R_{sca}$ RBs among the R RBs.

<Method B-3: Method for Configuring DCI by Combining MCS and RA Corresponding to Retransmission CBG Size>

In this method, CBG-based retransmission scheduling DCI (second DCI) may indicate a combination of an MCS index (M) and the number of RBs (R) corresponding to the size of a CBG scheduled for retransmission that is K (or a maximum TB size of K or smaller or a minimum TB size of K or greater), not a TB size of N, in a TB size table according to the combination of an MCS index and the number of RBs defined for TB-based scheduling and allocation information on R RBs.

In this case, a plurality of (M, R) combinations having different values may correspond to one K value. A field indicating an (M, R) combination and RA information, that is, a field indicating a combination of R RBs selected/allocated among a total of Rmax RBs, may be configured in the DCI.

In this method, bits of the sum of the sizes (number of bits) of an MCS field and an RA field in TB-based scheduling DCI (first DCI) minus the sum of the sizes (number of bits) of the (M, R) field and an RA field for the R RBs in the CBG-based retransmission scheduling DCI (second DCI) may be used for indicating a CBG to be retransmitted within the DCI for CBG-based scheduling.

In this method, an MCS index and the number of RBs may be indicated/allocated according to the size of an actually retransmitted CBG. Accordingly, a UE may receive/transmit a scheduled CBG using all of the R RBs indicated by the DCI.

<Method B-4: Method for Reinterpreting MCS Field in DCI for CBG-Based Retransmission Scheduling>

In this method, when an MCS field (referred to as a TB-MCS field) in TB-based scheduling DCI (first DCI) is configured with m bits, an MCS field (referred to as a CBG-MCS field) in CBG-based retransmission scheduling DCI (second DCI) may be configured to have a relatively smaller size of k bits (k<m). Here, the CBG-MCS field may be set to have some specified values among values for the TB-MCS field.

For example, the CBG-MCS field value may be set to 1) the lowest $2^k$ indexes or the highest $2^k$ indexes (corresponding to a modulation order and/or coding rate), or 2) L indexes lower than a TB-MCS index indicated through the TB-based scheduling DCI and ($2^k$−L−1) indexes higher than the TB-MCS index among the values for the TB-MCS field.

In this method, bits of the size of the TB-MCS field in the TB-based scheduling DCI (first DCI) minus the size of the CBG-MCS field in the CBG-based retransmission scheduling DCI (second DCI) may be used for indicating a CBG to be retransmitted within the CBG-based scheduling DCI (second DCI). According to this method, a UE may receive/transmit a scheduled CBG by applying a CBG-MCS index and RB allocation information indicated by the second DCI.

<Method B-5: Method for Reinterpreting RA Field in DCI for CBG-Based Retransmission Scheduling>

In this method, when an RA field (referred to as a TB-RA field) in TB-based scheduling DCI (first DCI) is configured with m bits, an RA field (referred to as a CBG-RA field) in CBG-based retransmission scheduling DCI (second DCI) may be configured to have a relatively smaller size of k bits (k<m).

Considering for the TB-RA field that the total number of RBs available for scheduling is $R_{max}$ and the minimum frequency resource allocation unit is a set of $L_{min}$ RBs, it may be considered for the CBG-RA field that 1) the total number of RBs available for scheduling is a value smaller than $R_{max}$ and/or 2) the minimum frequency resource allocation unit is a value greater than $L_{min}$.

In this method, bits of the size of a TB-RA field in the TB-based scheduling DCI (first DCI) minus the size of the CBG-MCS field in the CBG-based retransmission scheduling DCI (second DCI) may be used for indicating a CBG to be retransmitted within the CBG-based scheduling DCI (second DCI). According to this method, a UE may also receive/transmit a scheduled CBG by applying an MCS index and RB allocation information indicated by the second DCI.

<Method B-6: Method for Reinterpreting Particular Field in DCI for CBG-Based Retransmission Scheduling (Uplink)>

In this method, among various fields that can be included in TB-based scheduling DCI (first DCI), a particular field, for example, a field for requesting aperiodic CSI feedback transmission (referred to as an a-CSI field) and/or a field for triggering aperiodic sounding reference signal (SRS) transmission (referred to as an a-SRS field), may be used for indicating a CBG to be retransmitted within CBG-based scheduling DCI (second DCI).

That is, the a-CSI field and/or the a-SRS field in the TB-based scheduling DCI (first DCI) may be used for indicating aperiodic CSI feedback and/or aperiodic SRS transmission as originally used, while the a-CSI field and/or the a-SRS field in the CBG-based scheduling DCI (second DCI) may be set to indicate that aperiodic CSI feedback and/or aperiodic SRS transmission are not performed/allowed and may be used for indicating a CBG to be retransmitted. For example, when CBG transmission is preset through an RRC signal, the a-CSI field and/or the a-SRS field may be interpreted as in the present invention.

(C) CBG Indication Method in CBG-Based Retransmission Scheduling DCI

1) Method C-1: Method for determining number of CBGs scheduled according to TB size indicated CBG scheduling DCI In this method, it is assumed that a UE already knows a TB size of N and the total number M of CBGs forming a TB, which are indicated through first TB-based scheduling DCI (first DCI). Under this assumption, it is possible to determine the number of CBGs to be retransmitted, which is M', scheduled through the CBG retransmission scheduling DCI on the basis of a TB size of N' (changed TB size) indicated through the CBG retransmission scheduling DCI (second DCI) in (B).

For example, M' may be determined such that the total size (e.g., the number of bits) of M' CBGs is a maximum value of N' or less or a minimum value of N' or greater.

According to this method, when the number of CBGs to be retransmitted can be known, index information on a scheduled CBG may be indicated through CRC masking applied to a particular field CB in the DCI or a CB. Assuming that only contiguous CBGs are retransmitted, only index information on a starting (first) CBG among the contiguous CBGs may be indicated through CRC masking applied to a particular field in the DCI or a CB.

The index of the retransmitted CBG or the index information on the starting CBG may also be indicated using a field/bit set for indicating a CBG to be retransmitted within CBG-based scheduling DCI, described above in method B-4 or B-5.

When an NDI value in the DCI (second DCI) for scheduling a particular HARQ process ID is toggled compared to an NDI value in the previously received DCI (first DCI), which corresponds to the same HARQ process ID, and the second DCI indicates CBG-based retransmission scheduling, the UE may not identify a total TB size. In this case, the UE may either 1) transmit a NACK of the entire TB or all CBGs or 2) discard the second DCI, thereby inducing a BS to perform TB-based scheduling (DCI transmission).

(D) Method for Mapping Uplink CB(G) when Performing UL Transmission by Hopping Between Slots 1) Method D-1: NR may support an operation in which delay-sensitive URLLC data punctures some of relatively delay-insensitive eMBB data. In this case, since the probability of reception (decoding) failure may increase only in a particular symbol (due to the impact of a time-selective interference signal), a frequency-first data mapping scheme is considered. The frequency-first mapping scheme may be efficient in combination with a CB(G)-based retransmission technique.

First, frequency-first data mapping refers to a method of mapping data to subcarriers located in a first symbol in a time domain and then mapping data to subcarriers located in a second symbol in the time domain.

In particular, in UL transmission based on DFT-s-OFDM, a (sub-slot) frequency hopping operation may be applied in a slot in order to obtain a frequency diversity gain.

However, when a frequency hopping operation is supported while mapping data by the frequency-first scheme, one CB(G) is mapped to only frequency resources at one side in a particular sub-slot and thus may not obtain a frequency diversity gain.

To solve this problem, the following methods may be applied.

I. Cross Sub-Slot Frequency-First Mapping Method by Symbol or by Symbol Group (i.e., a Plurality of Symbols)

Figure 11:
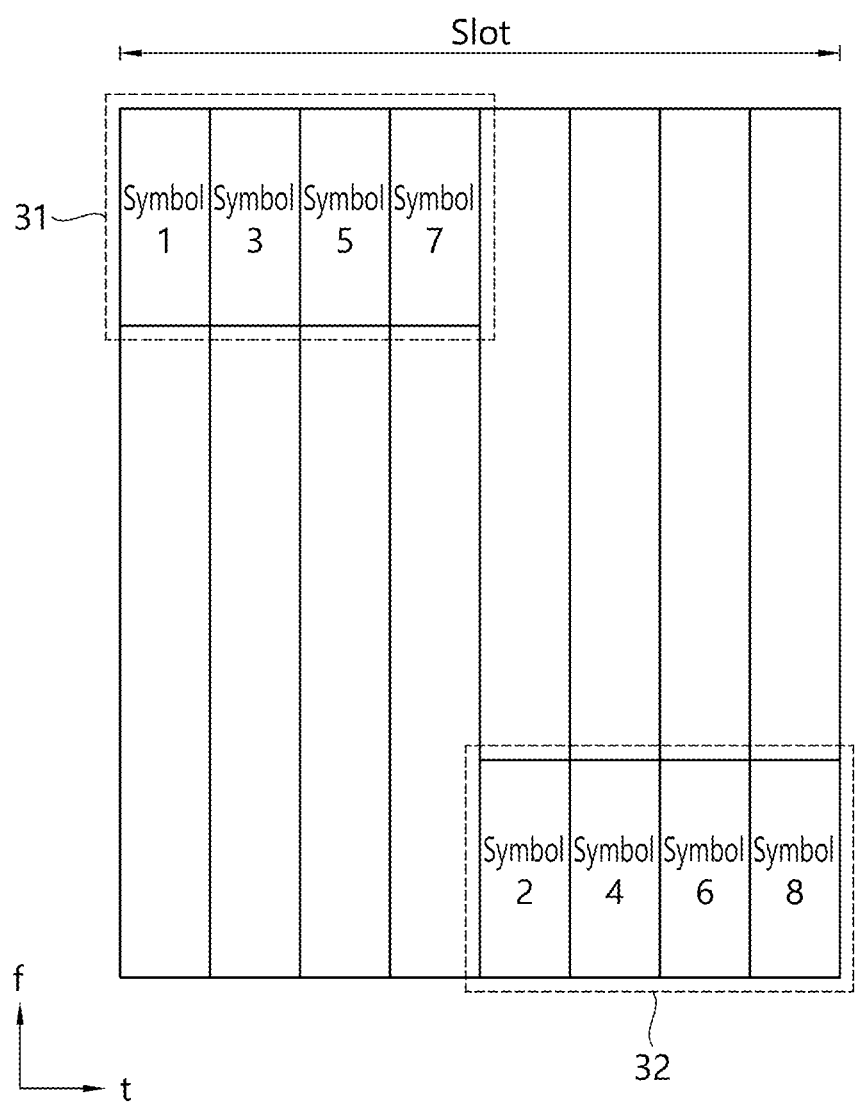
FIG. 11 illustrates a cross sub-slot frequency-first mapping method by symbol or by symbol group (i.e., a plurality of symbols). A sub-slot may be a resource unit smaller than a slot.

FIG. 11 illustrates a cross sub-slot frequency-first mapping method by symbol or by symbol group (i.e., a plurality of symbols). A sub-slot may be a resource unit smaller than a slot.

Referring to FIG. 11, when data to be transmitted is mapped to sub-slots 31 and 32 by one symbol using cross frequency-first mapping, the data may be cross-mapped to the respective sub-slots in the order of symbol 1, symbol 2, symbol 3, . . . , symbol 8.

That is, transmission data arranged on the basis of a CB or CBG index is subjected to frequency-first mapping over first symbols (groups) in a plurality of sub-slots 31 and 32 and then is subjected to frequency-first mapping over second symbols (groups) in the plurality of sub-slots 31 and 32, thereby sequentially mapping the entire transmission data to a plurality of symbols (groups) in the plurality of sub-slots 31 and 32.

II. Method for Dispersively Mapping CBs Included in Particular CBG to Respective Sub-Slots by Alternately Allocating Each of a Plurality of CBs Included in CBG to Each Sub-Slot FIG. 12 illustrates a method for dispersively mapping CBs included in a particular CBG to respective sub-slots by alternately allocating each CB included in a CBG to each sub-slot.

Figure 12:
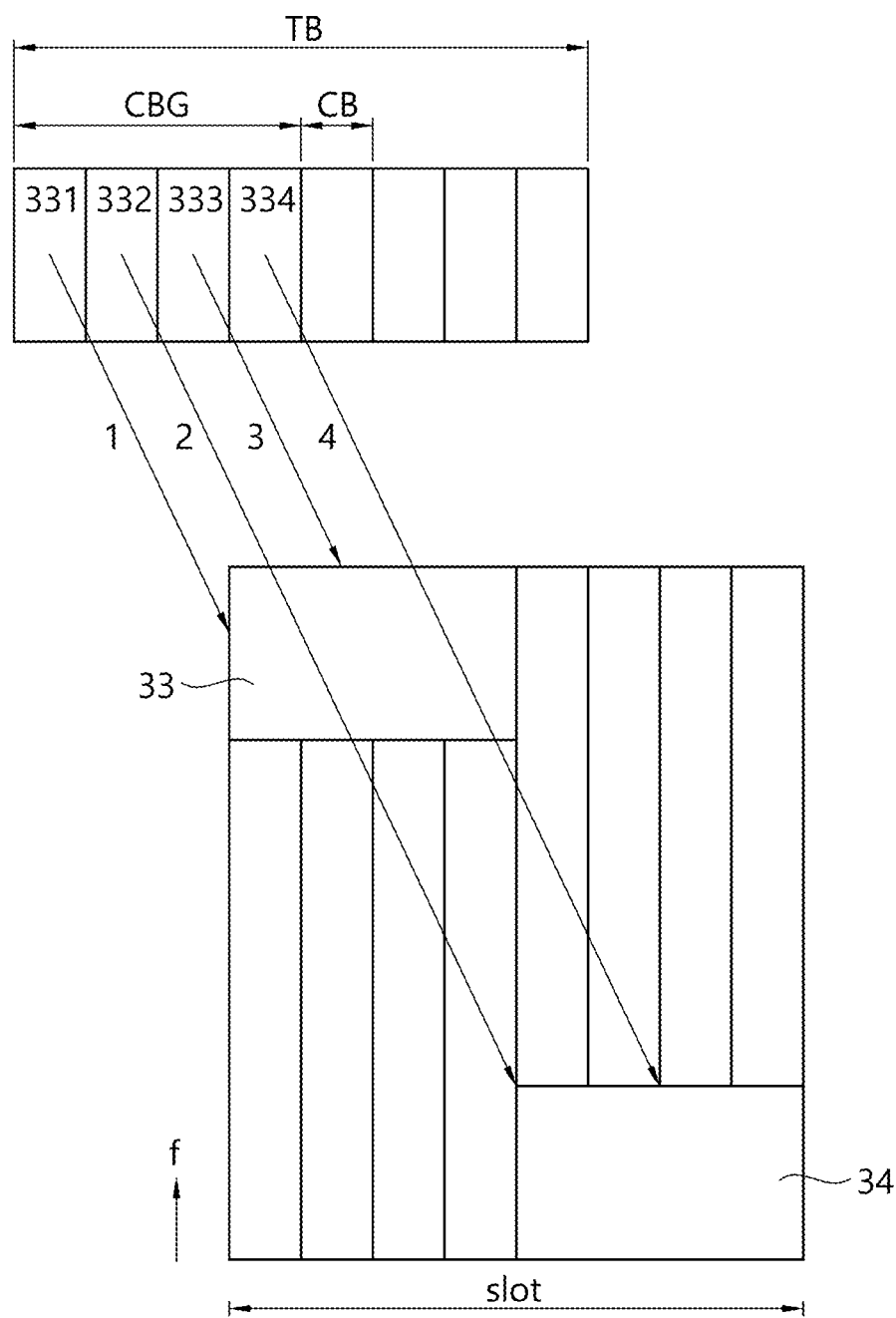
FIG. 12 illustrates a method for dispersively mapping CBs included in a particular CBG to respective sub-slots by alternately allocating each CB included in a CBG to each sub-slot.

Referring to FIG. 12, assuming that one TB includes two CBGs, each of which includes four CBs, four CBs in a CBG are alternately mapped to respective sub-slots. For example, a first CBG of the TB includes four CBs 331, 332, 333, and 334. Here, a first CB 331 and a third CB 333 may be mapped to a first sub-slot 33, and a second CB 332 and a fourth CB 334 mag be mapped to a second sub-slot 34.

That is, in general, with all data arranged according to the CBG index in a TB and according to the CB index in each CBG, data mapping may be sequentially performed on each CBG according to the CBG index by method I.

(E) Method for Indicating Resource Allocation Type and Waveform for PUSCH.

Hereinafter, resource allocation (RA) type 0 is a method of allocating a resource block group (RBG), which is a set of contiguous PRBs, to a UE through a bitmap. That is, in RA type 0, an RA unit is not one RB but one RBG. The size of an RBG, that is, the number of RBs included in the RBG, is determined depending on the system bandwidth. RA type 0 is also referred to as an RBG method.

RA type 1 is a method of allocating resources to a UE by the PRB in a subset through a bitmap. A subset includes a plurality of RBGs. RA type 1 is also referred to as a subset method.

RA type 2 includes a method of allocating contiguous PRBs (allocating a localized virtual resource block (LVRB)) and a method of allocating resources including noncontiguous PRBs (allocating a distributed virtual resource block (DVRB)). RA type 2 is also referred to as a compact method.

(1) Method E-1: In NR, a UE may support two waveforms, that is, cyclic prefix-orthogonal frequency division multiplexing (CP-OFDM, also simply referred to as OFDM) and discrete Fourier transform spread OFDM (DFT-s-OFDM, also referred to as single carrier FDMA (SC-FDMA)). Different RA types may be used for the respective waveforms. Generally, for DFT-s-OFDM, since it is important to obtain a low peak-to-average power ratio (PAPR), RA type 0 of allocating only contiguous RB regions is introduced in an LTE UL, and RA type 1 of allocating contiguous RB regions in each of clusters which are separated from each other is used. CP-OFDM is used for an LTE DL in which a PAPR is relatively unimportant and employs an RA method of freely allocating the entire system bandwidth without any restriction on RAs, such as RA types 0, 1 and 2.

Methods for semi-statically or dynamically indicating a waveform to a UE are currently considered, and an RA type in DCI may be interpreted differently according to the indicated waveform. For example, when one of the two waveforms, DFT-s-OFDM, is semi-statically or dynamically indicated to a UE, an RA type field in DCI may be interpreted as UL RA type 0 or 1.

Alternatively, a DCI payload size can be reduced by joint encoding of a waveform indication and an RA type indication. For example, since DL RA types 0 and 1 are distinguished by a header in an RA field, when there are a total of four RA types for a DL and a UL and the respective RA types are mapped to four states, it is possible to indicate both a waveform and an RA type using a two-bit RA type field.

2) Method E-2: In the existing LTE system, a resource for PUSCH transmission is allocated through an UL scheduling DCI (DCI format 0) called a UL grant. An RA field in the UL grant includes: i) a header for distinguishing RA types 0 and 1; and ii) a bitmap or resource indication value (RIV) for actual resource allocation.

In NR, since the two waveforms, that is, DFT-s-OFDM and CP-OFDM, can be supported in UL transmission, it is possible to indicate not only an RA type but also a waveform to be used to a UE through PUSCH scheduling DCI. This method proposes methods for a BS to indicate both a UL waveform and an RA type to a UE by adding three bits to UL uplink scheduling DCI.

Before a description, terms used in each method are defined as follows.

1) DL RA type 0: A resource is indicated through an RBG bitmap, 2) DL RA type 1 (DL RA type 1): A resource is indicated through a partial RBG bitmap or an RBG subset bitmap; Types 0 and 1 are distinguished by a header, 3) DL RA type 2: Contiguous RBs are allocated; localized allocation and distributed allocation are distinguished, 4) UL RA type 0: Contiguous RBs are allocated, 5) UL RA type 1: Two noncontiguous RB clusters are allocated, 6) RBG: Resource block group, 7) LVRB: Localized virtual RB, 8) DVRB: Distributed virtual RB.

The following table illustrates a waveform or RA type indicated by each bit field where three one-bit fields are defined as bit indexes 0, 1, and 2, respectively.

TABLE 1

|  | Bit index 0 | Bit index 1 | Bit index 2 |
|---|---|---|---|
| Method 1 | Indicates CP-OFDM transmission | Indicates DL RA type 0/1 or DL RA type 2 | When DL RA type 0/1 is selected: Indicates RA type 0 or RA type 1 When DL RA type 2 is selected: Indicates LVRB- or DVRB-based allocation |
|  | Indicates DFT-s-OFDM transmission | Alt 1: Indicates LVRB-based DL RA type 2 or DVRB-based DL RA type 2 Alt 2: Indicates UL RA type 0 or UL RA type 1 Alt 3: Indicates UL RA type 0 with frequency hopping (F-hopping) or UL RA type 0 without F-hopping | Not used (or incorporated into another field in DCI, e.g., used for RA) |
| Method 2 | Indicates CP-OFDM transmission | Indicates DL RA type 0 or DL RA type 1 | Not used (or incorporated into another field in DCI, e.g., used for RA) |
|  | Indicates DFT-S-OFDM transmission | Alt 1: Indicates LVRB-based DL RA type 2 or DVRB-based DL RA type 2 Alt 2: Indicates UL RA type 0 or UL RA type 1 Alt 3: Indicates UL RA type 0 with F-hopping or UL RA type 0 without F-hopping |  |
| Method 3 | Indicates CP-OFDM transmission | Indicates DL RA type 0 or DL RA type 2 | When DL RA type 0 is selected: Not used (or incorporated into another field in DCI, e.g., used as RA) When DL RA type 2 is selected: Indicates LVRB- or DVRB-based allocation |
|  | Indicates DFT-S-OFDM transmission | Alt 1: Indicates LVRB-based DL RA type 2 or DVRB-based DL RA type 2 Alt 2: Indicates UL RA type 0 or UL RA type 1 Alt 3: Indicates UL RA type 0 with F-hopping or UL RA type 0 without F-hopping | Not used (or incorporated into another field in DCI, e.g., used for RA) |
| Method 4 |  | Indicates (CP-OFDM + DL RA type 0) combination, (CP-OFDM + DL RA type 1) combination, (CP-OFDM + DL RA type 2) combination, or (DFT-S-OFDM) combination | (When CP-OFDM is selected) When DL RA type 0 or 1 is selected: Not used (or incorporated into another field in DCI, e.g., used for RA) When DL RA type 2 is selected: Indicates LVRB- or DVRB-based allocation (When DFT-S-OFDM is selected) Alt 1: Indicates LVRB-based DL RA type 2 or DVRB-based DL RA type 2 Alt 2: Indicates UL RA type 0 or UL RA type 1 Alt 3: Indicates UL RA type 0 with F-hopping or UL RA type 0 without F-hopping |
| Method 5 |  | Indicates (CP-OFDM + DL RA type 0) combination, (CP-OFDM + LVRB based DL RA type 2) combination, (CP-OFDM + DVRB based DL RA type 2) combination, or (DFT-S-OFDM) combination | (When CP-OFDM is selected) Not used (or incorporated into another field in DCI, e.g., used for RA) (When DFT-S-OFDM is selected) Alt 1: Indicates LVRB-based DL RA type 2 or DVRB-based DL RA type 2 Alt 2: Indicates UL RA type 0 or UL RA type 1 Alt 3: Indicates UL RA type 0 with F-hopping or UL RA type 0 without F-hopping |

Figure 13:
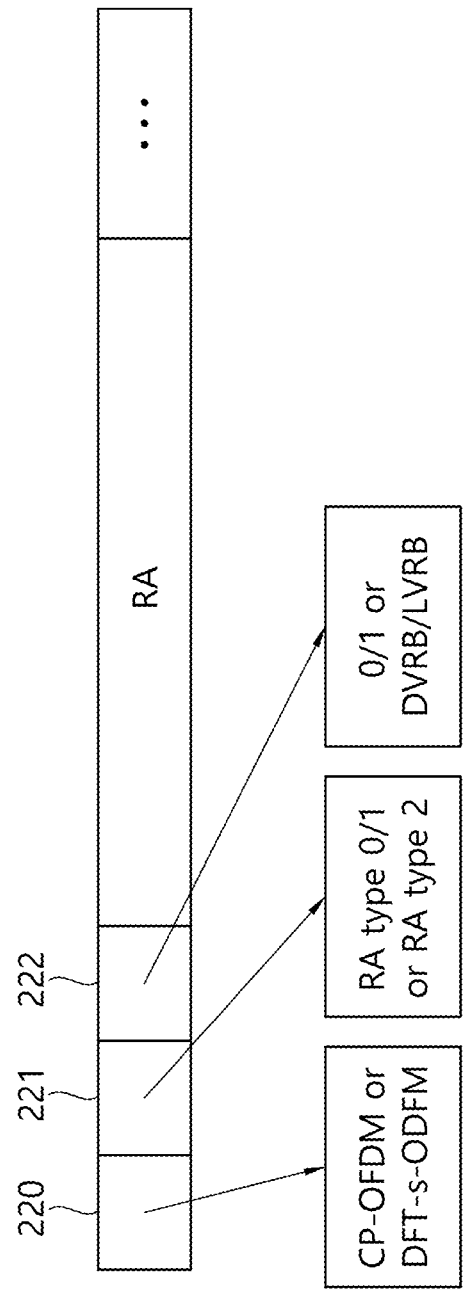
FIG. 13 illustrates the structure of UL scheduling DCI according to methods 1, 2, and 3 in Table 1.

FIG. 13 illustrates the structure of UL scheduling DCI according to methods 1, 2, and 3 in Table 1.

Referring to FIG. 13, a first bit field 220 may indicate CP-OFDM or DFT-s-OFDM, and a second bit field 221 indicates an RA type. Here, the second bit field indicating the RA type may be interpreted differently depending on the waveform determined by the first bit field. For example, when the first bit field indicates CP-OFDM, the second bit field is interpreted as indicating RA type 0/1 or RA type 2. When the first bit field indicates DFT-s-OFDM, the second bit field may be interpreted as indicating RA type 0 or 1.

A third bit field 222 may be interpreted differently depending on the waveform and the RA type respectively indicated by the first bit field 220 and the second bit field 221.

For example, when the first bit field 220 indicates CP-OFDM as a waveform and the second bit field 221 indicates RA type 0/1, the third bit field 222 is interpreted as indicating RA type 0 or 1. When the second bit field 221 indicates RA type 2, the third bit field 222 may be interpreted as indicating a DVRB or LVRB.

In another example, when the first bit field 220 indicates DFT-s-OFDM as a UL waveform, if the second bit field 221 indicates only whether the RA type is 0 or 1, the third bit field 222 may be incorporated into another field in the DCI. For example, the third bit field 222 may be incorporated into an RA field and may be used for RA.

Specifically, when the three bit fields 220, 221, and 222 respectively have values of 1, 0, and 1, it may be interpreted that CP-OFDM is indicated as the UL waveform, RA type 0/1 is indicated as the RA type, and RA type 1 is indicated. Alternatively, when the three bit fields 220, 221, and 222 respectively have values of 1, 1, and 1, it may be interpreted that CP-OFDM, RA type 2, and a DVRB are indicated. Alternatively, when the two bit fields 220 and 221 respectively have values of 0 and 1, it may be interpreted that DFT-s-OFDM and RA type 1 are indicated.

Figure 14:
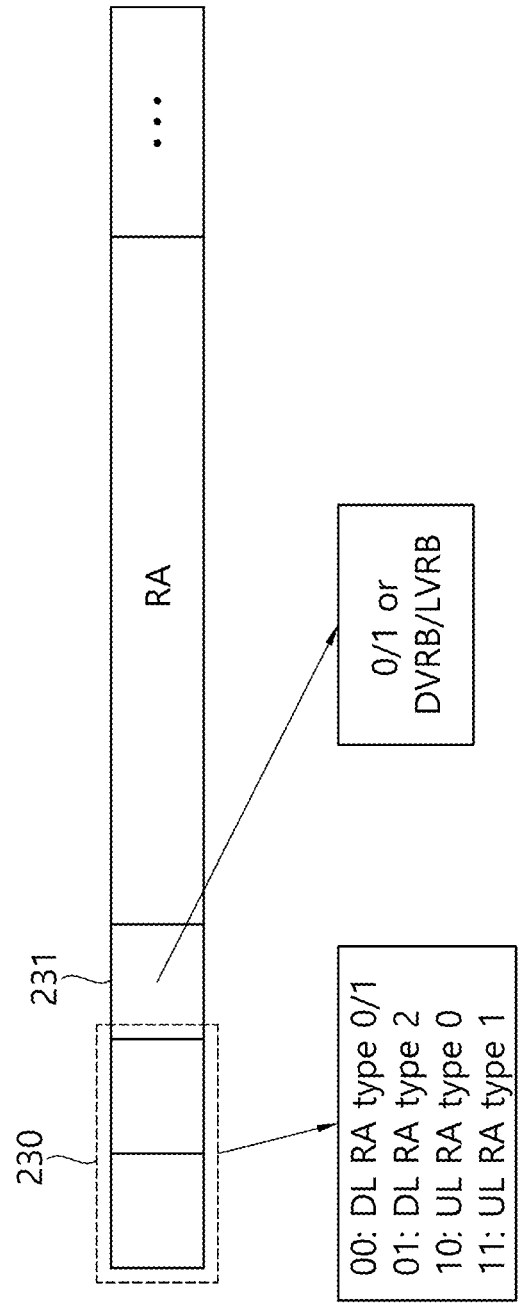
FIG. 14 illustrates another example of indicating a waveform and an RA type by interpreting a bit field added to UL scheduling DCI according to methods 4 and 5 in Table 1.

FIG. 14 illustrates another example of indicating a waveform and an RA type by interpreting a bit field added to UL scheduling DCI according to methods 4 and 5 in Table 1.

Referring to FIG. 14, when the value of first two bits 230 is 00, the waveform is CP-OFDM and the RA type is DL RA type 0/1. When the value of the first two bits 230 is 01, the waveform is CP-OFDM and the RA type is DL RA type 2. When the value of the first two bits 230 is 10, the waveform is DFT-s-OFDM and the RA type is UL RA type 0. When the value of the first two bits 230 is 11, the waveform is DFT-s-OFDM and the RA type is UL RA type 1. That is, one of the four RA types may be indicated using the first two bits 230 in the DCI.

Further, a third bit field 231 can be used to indicate one of DL RA types 0 and 1 or to indicate a DVRB or an LVRB in DL RA type 2.

When a UL RA type is selected, that is, when DFT-s-OFDM is selected as the waveform, the third bit field may also be incorporated into another field in the DCI.

(F) Transmission (Tx) Buffer Flushing of UE

1) Method F-1: In NR, UL data transmission may be performed by the CBG, not by the TB, as in DL data transmission. Due to the absence of a PHICH, which carries HARQ-ACK information for a PUSCH in LTE, retransmission of some CBGs that have failed to be decoded may be indicated through a DCI transmitted via a control information channel, such as a PDCCH, called a grant.

Therefore, a CBG of which retransmission is not indicated through a UL grant may be flushed out of a Tx buffer of a UE and the buffer is used to store data to be subsequently transmitted, thereby increasing the efficiency of the Tx buffer of the UE.

For example, it is assumed that a TB transmitted via a PUSCH includes four CBGs, among which first and third CBGs have failed to be decoded by a BS (gNB). In this case, the BS may indicate retransmission of the first and third CBGs required to be retransmitted among the CBGs in the TB to the UE through a UL grant. Therefore, second and fourth CBGs, which are considered to be successfully decoded, may be flushed out of the Tx buffer of the UE, and the buffer may be used to store next transmission data.

This UE operation may be valid only under the condition that it is indicated through a UL grant that at least a CBG having failed to be decoded among a plurality of CBGs included in a TB initially transmitted by a BS is always retransmitted.

Methods A-1/2/3/4/5 proposed above may be applied independently, and proposed methods B-1/2/3/4/5 may be applied independently or in combination. For example, it is possible to apply methods B-1 and B-5 in combination. Further, particular one of methods A-1/2/3/4/5 may be applied in combination with particular one or a plurality of methods B-1/2/3/4/5/6. For example, it is possible to apply methods A-1 and B-1 (or B-1 and B-5) in combination.

FIG. 15 illustrates CBG-based scheduling DCI in a combination of proposed methods A-1 and B-1.

Referring to FIG. 15, each of TB-based scheduling DCI and CBG-based scheduling DCI may indicate whether the DCI is DCI for TB-based scheduling or DCI for CBG-based retransmission scheduling through a one-bit flag 241 and 242.

The TB-based scheduling DCI has a five-bit MCS field, while the CBG-based scheduling DCI has a two-bit MCS field. That is, the size of the MCS field included in the CBG-based retransmission scheduling DCI may be set to a smaller number of bits (2 bits) than that of the MCS field (5 bits) included in the TB-based scheduling DCI. On the other hand, the size of an RA field is set to the same number of bits in the TB-based scheduling DCI and the CBG-based retransmission scheduling DCI. Here, bits (3 bits) of the size (5 bits) of the MCS field in the TB-based scheduling DCI minus the size (2 bits) of the MCS field in the CBG-based retransmission scheduling DCI may be used to indicate a CBG to be retransmitted in the CBG-based scheduling DCI.

Figure 16:
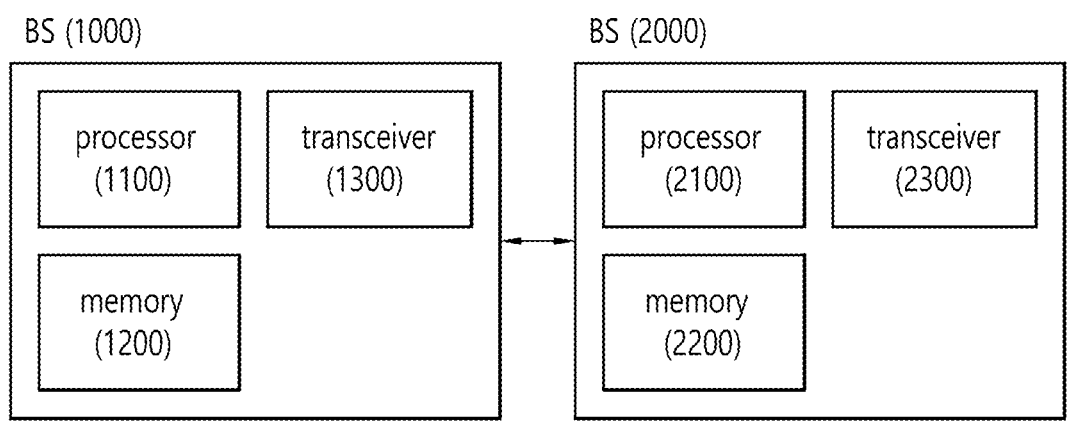
FIG. 16 is a block diagram illustrating a BS and a UE.

FIG. 16 is a block diagram illustrating a BS and a UE.

The BS 1000 includes a processor 1100, a memory 1200, and a transceiver 1300. The processor 1100 implements proposed functions, processes, and/or methods. The memory 1200 is connected to the processor 1100 and stores various pieces of information for driving the processor 1100. The transceiver 1300 is connected to the processor 1100 and transmits and/or receives radio signals.

The UE 2000 includes a processor 2100, a memory 2200, and a transceiver 2300. The processor 2100 implements proposed functions, processes, and/or methods. The memory 2200 is connected to the processor 2100 and stores various pieces of information for driving the processor 2100. The transceiver 2300 is connected to the processor 2100 and transmits and/or receives radio signals.

Figure 17:
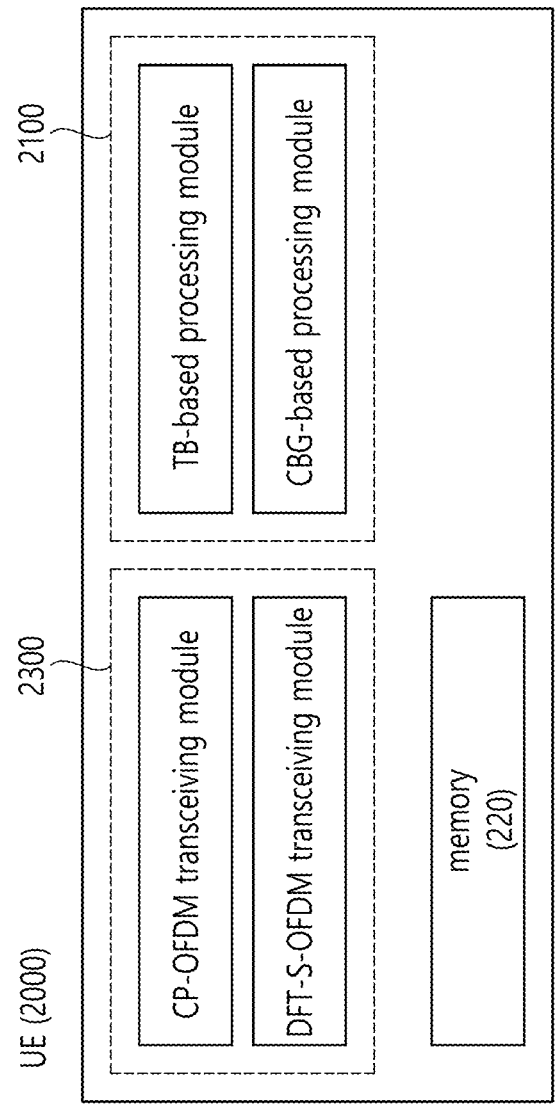
FIG. 17 is a block diagram illustrating a UE.

FIG. 17 is a block diagram illustrating a UE.

Referring to FIG. 17, a processor 2100 included in the UE 2000 may include a TB-based processing module and a CBG-based processing module. The TB-based processing module may generate/process/transmit/receive data by the TB and may generate an ACK/NACK by the TB. The CBG-based processing module may generate/process/transmit/receive data by the CBG and may generate an ACK/NACK by the CBG.

Although FIG. 17 illustrates a UE device, a BS may also include a processor/transceiver.

The processors 1100 and 2100 may include an application-specific integrated circuit (ASIC), a separate chipset, a logic circuit, a data processing device, and/or a converter to convert a baseband signal and a radio signal to and from one another. The memories 1200 and 2200 may include a read-only memory (ROM), a random access memory (RAM), a flash memory, a memory card, a storage medium, and/or other storage devices. The transceivers 1300 and 2300 may include one or more antennas to transmit and/or receive radio signals.

When an embodiment is implemented in software, the aforementioned methods may be implemented with a module (process, function, or the like) to perform the aforementioned functions. The module may be stored in the memories 1200 and 2200 and may be performed by the processors 1100 and 2100. The memories 1200 and 2200 may be disposed inside or outside the processors 1100 and 2100 and may be connected to the processors 1100 and 2100 via various well-known means.

What is claimed is:

1. A method of transmitting, by a user equipment (UE), data in a wireless communication system, the method comprising:
- receiving a first downlink control information (DCI) comprising (i) a first hybrid automatic repeat request (HARQ) process identifier (ID) field and (ii) a first new data indicator (NDI); and
- receiving a second DCI comprising (i) a second HARQ process ID field and (ii) a second NDI;
- wherein in a first case that the UE receives a higher layer signal that enables a code block group (CBG) based transmission of the UE:
  - the first DCI further comprises (iii) first scheduling information for at least one CBG of a first transport block (TB);
  - based on (i) the first HARQ process ID field in the first DCI having a same value as a HARQ process ID field in a previously received DCI and (ii) the first NDI in the first DCI having a different value from a NDI in the previously received DCI, the UE transmits all CBGs in the first TB;
  - the second DCI further comprises (iii) second scheduling information for at least one CBG in a second TB, and
  - based on (i) the first HARQ process ID field in the first DCI having a same value as the second HARQ process ID field in the second DCI and (ii) the second NDI in the second DCI having a same value as the first NDI in the first DCI, the UE transmits the at least one CBG in the second TB that are specified by the second scheduling information,
- wherein in a second case that the UE is not provided with the higher layer signal that enables the CBG based transmission of the UE:
  - based on (i) the first HARQ process ID field in the first DCI having a same value as the HARQ process ID field in the previously received DCI and (ii) the first NDI in the first DCI having a different value from the NDI in the previously received DCI, the UE transmits the first TB, and
  - based on (i) the first HARQ process ID field in the first DCI having a same value as the second HARQ process ID field in the second DCI and (ii) the second NDI in the second DCI having a same value as the first NDI in the first DCI, the UE transmits the second TB.

2. The method of claim 1, wherein another field in the first DCI is interpreted as TB-based scheduling information.

3. The method of claim 1, wherein another field in the second DCI is interpreted as CBG-based scheduling information.

4. The method of claim 1, wherein the second DCI comprises a CBG indication field indicating at least one of code block groups (CBGs) included in a transport block.

5. The method of claim 1, wherein the second TB is a transport block for re-transmitting the first TB.

6. A user equipment (UE), the UE comprising:
- a transceiver for transmitting and receiving a radio signal; and
- a processor coupled to the transceiver,
- wherein the processor is configured to:
- receive a first downlink control information (DCI) comprising (i) a first hybrid automatic repeat request (HARQ) process identifier (ID) field and (ii) a first new data indicator (NDI); and
- receive a second DCI comprising (i) a second HARQ process ID field and (ii) a second NDI;
- wherein in a first case that the UE receives a higher layer signal that enables a code block group (CBG) based transmission of the UE;
  - the first DCI further comprises (iii) first scheduling information for at least one CBG of a first transport block (TB);
  - based on (i) the first HARQ process ID field in the first DCI having a same value as a HARQ process ID field in a previously received DCI and (ii) the first NDI in the first DCI having a different value from a NDI in the previously received DCI, the UE transmits all CBGs in the first TB;
  - the second DCI further comprises (iii) second scheduling information for at least one CBG in a second TB, and
  - based on (i) the first HARQ process ID field in the first DCI having a same value as the second HARQ process ID field in the second DCI and (ii) the second NDI in the second DCI having a same value as the first NDI in the first DCI, the UE transmits the at least one CBG in the second TB that are specified by the second scheduling information,
- wherein in a second case that the UE is not provided with the higher layer signal that enables the CBG based transmission of the UE:
  - based on (i) the first HARQ process ID field in the first DCI having a same value as the HARQ process ID field in the previously received DCI and (ii) the first NDI in the first DCI having a different value from the NDI in the previously received DCI, the UE transmits the first TB, and
  - based on (i) the first HARQ process ID field in the first DCI having a same value as the second HARQ process ID field in the second DCI and (ii) the second NDI in the second DCI having a same value as the first NDI in the first DCI, the UE transmits the second TB.

7. The UE of claim 6, wherein another field in the first DCI is interpreted as TB-based scheduling information.

8. The UE of claim 6, wherein another field in the second DCI is interpreted as CBG-based scheduling information.

9. The UE of claim 6, wherein the second DCI comprises a CBG indication field indicating at least one of code block groups (CBGs) included in a transport block.

10. The UE of claim 6, wherein the second TB is a transport block for re-transmitting the first TB.

* * * * *